United States Patent
Ujiie

(10) Patent No.: US 12,425,426 B2
(45) Date of Patent: Sep. 23, 2025

(54) ANOMALY DETECTION SYSTEM AND ANOMALY DETECTION METHOD

(71) Applicant: Panasonic Intellectual Property Corporation of America, Torrance, CA (US)

(72) Inventor: Yoshihiro Ujiie, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 328 days.

(21) Appl. No.: 17/825,570

(22) Filed: May 26, 2022

(65) Prior Publication Data

US 2022/0286473 A1 Sep. 8, 2022

Related U.S. Application Data

(63) Continuation of application No. PCT/JP2021/019265, filed on May 20, 2021.

(30) Foreign Application Priority Data

May 27, 2020 (JP) .................. 2020-091882

(51) Int. Cl.
*H04L 9/40* (2022.01)
*H04L 12/40* (2006.01)

(52) U.S. Cl.
CPC .......... *H04L 63/1425* (2013.01); *H04L 12/40* (2013.01); *H04L 63/1466* (2013.01); *H04L 2012/40215* (2013.01)

(58) Field of Classification Search
CPC .. H04L 63/1425; H04L 63/1466; H04L 12/40
See application file for complete search history.

(56) References Cited

U.S. PATENT DOCUMENTS

2012/0197481 A1* 8/2012 Takeda ................... G07C 5/085
701/32.7
2016/0188396 A1* 6/2016 Sonalker ............... G06F 11/079
714/37

(Continued)

FOREIGN PATENT DOCUMENTS

| JP | 2015-164382 | 9/2015 |
| JP | 6423402 | 11/2018 |
| WO | 2020/090146 | 5/2020 |

OTHER PUBLICATIONS

Marchetti, Mirco; Stabili, Dario; "Anomaly detection of CAN bus messages through analysis of ID sequences," IEEE Intelligent Vehicles Symposium (IV), Los Angeles, CA, USA, Jun. 11-14, 2017, pp. 1577-1583.*

(Continued)

*Primary Examiner* — Victor Lesniewski
(74) *Attorney, Agent, or Firm* — Greenblum & Bernstein, P.L.C.

(57) ABSTRACT

An anomaly detection system is a system in an in-vehicle network system that includes one or more ECUs mounted on a vehicle and in which the vehicle and a server are capable of communicating with each other through a plurality of communication routes. The anomaly detection system includes: an anomaly detector that detects an anomaly in the vehicle; a determiner that determines, out of the plurality of communication routes, a communication route for transmitting anomaly detection result information indicating a result of detection of the anomaly in the vehicle to the server, according to occurrence of a specific anomaly; and an anomaly detection result transmitter that transmits the anomaly detection result information to the server using the communication route determined.

13 Claims, 21 Drawing Sheets

(56) References Cited

U.S. PATENT DOCUMENTS

| | | | |
|---|---|---|---|
| 2016/0330629 A1* | 11/2016 | Laifenfeld | H04W 12/12 |
| 2017/0093211 A1 | 3/2017 | Nakagawa et al. | |
| 2017/0288951 A1* | 10/2017 | Kurauchi | H04L 43/0811 |
| 2018/0196941 A1* | 7/2018 | Ruvio | H04L 63/1425 |
| 2018/0295147 A1 | 10/2018 | Haga et al. | |
| 2019/0081960 A1* | 3/2019 | Kupfer | H04L 63/1416 |
| 2019/0229976 A1* | 7/2019 | Dhesikan | H04L 41/0681 |
| 2019/0260800 A1* | 8/2019 | Shalev | H04L 63/0428 |
| 2019/0281052 A1* | 9/2019 | Lekkas | H04L 9/14 |
| 2019/0356608 A1* | 11/2019 | Tanaka | H04W 24/04 |
| 2020/0120117 A1* | 4/2020 | Hong | H04L 12/4013 |
| 2021/0029061 A1* | 1/2021 | Mizukoshi | H04L 49/254 |
| 2021/0029148 A1* | 1/2021 | Wee | G06F 21/552 |
| 2021/0075800 A1* | 3/2021 | Paraskevas | H04L 63/1441 |
| 2021/0075807 A1* | 3/2021 | Park | H04L 9/0894 |
| 2021/0237665 A1 | 8/2021 | Tamura et al. | |
| 2021/0344514 A1* | 11/2021 | Barrett | H04L 9/3268 |
| 2021/0344700 A1* | 11/2021 | Ueno | H04L 67/12 |
| 2022/0182402 A1* | 6/2022 | Leslie | G06F 18/231 |
| 2022/0292250 A1* | 9/2022 | Sharzer | G06F 3/0482 |
| 2023/0282043 A1* | 9/2023 | Brunda | G07C 5/0816 |
| | | | 701/31.4 |
| 2023/0315874 A1* | 10/2023 | Litichever | G06F 21/606 |
| | | | 726/1 |

OTHER PUBLICATIONS

Sharma, Priyanka; Möller, Dietmar P. F.; "Protecting ECUs and Vehicles Internal Networks," IEEE International Conference on Electro/Information Technology (EIT), Rochester, MI, USA, May 3-5, 2018, pp. 465-470.*

International Search Report (ISR) from International Searching Authority (Japan Patent Office) in International Pat. Appl. No. PCT/JP2021/019265, dated Jul. 20, 2021, together with an English language translation.

* cited by examiner

FIG. 2
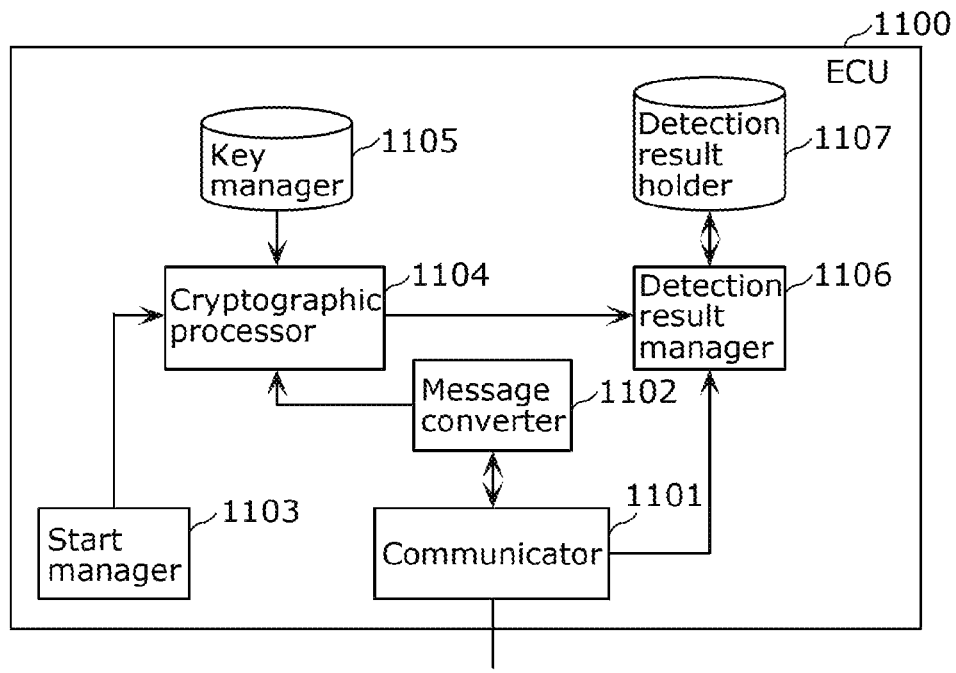
FIG. 3
| Error ID | Type |
|---|---|
| 1 | Authenticated Boot error |
| 2 | MAC authentication error |
| 3 | TEE (Trusted Execution Environment) start error |
FIG. 4
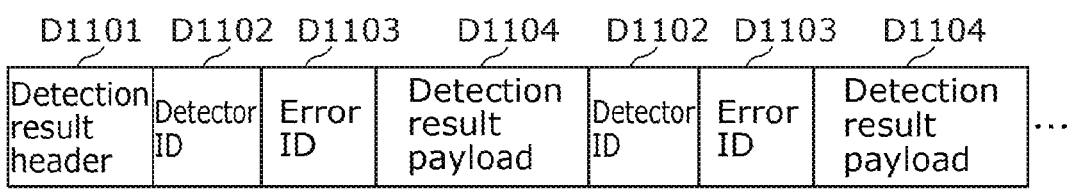

FIG. 5
| Error ID | Time of occurrence | Detection result payload data |
|---|---|---|
| 1 | YYYY/MM/DD HH:MM | - |
| 2 | YYYY/MM/DD HH:MM | (Target message data) |
| 3 | YYYY/MM/DD HH:MM | - |
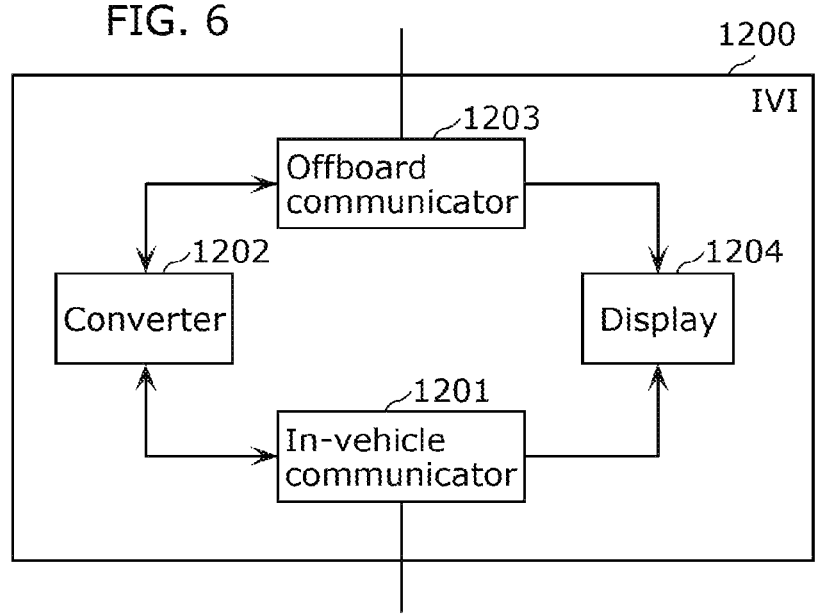
FIG. 6
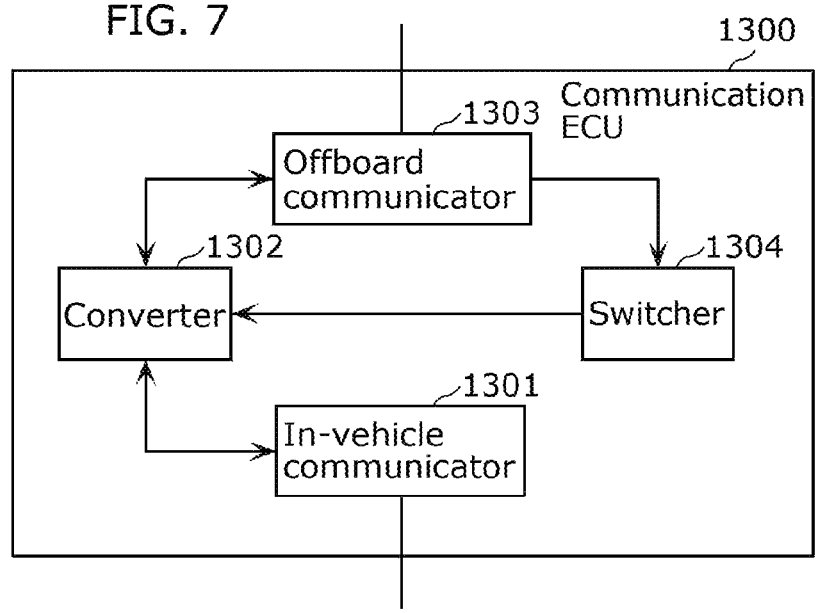
FIG. 7

FIG. 19

| Error ID | Type | Communication route |
|---|---|---|
| 1 | Authenticated Boot error | Charging ECU |
| 2 | MAC authentication error | Communication ECU |
| 3 | TEE (Trusted Execution Environment) start error | Charging ECU |

FIG. 20

| Detection result header (D1101) | Detector ID (D1102) | Error ID (D1103) | Detection result payload (D1104) |
|---|---|---|---|

FIG. 21

| Detection result header (D1201) | Vehicle ID (D1202) | Detector ID (D1203) | Error ID (D1204) | Detection result payload (D1205) |
|---|---|---|---|---|

| Error ID | Type | Communication route |
|---|---|---|
| 1 | Authenticated Boot error | Charging ECU |
| 2 | MAC authentication error | Communication ECU |
| 3 | TEE (Trusted Execution Environment) start error | Charging ECU |

ANOMALY DETECTION SYSTEM AND ANOMALY DETECTION METHOD

CROSS REFERENCE TO RELATED APPLICATIONS

This is a continuation application of PCT International Application No. PCT/JP2021/019265 filed on May 20, 2021, designating the United States of America, which is based on and claims priority of Japanese Patent Application No. 2020-091882 filed on May 27, 2020. The entire disclosures of the above-identified applications, including the specifications, drawings and claims are incorporated herein by reference in their entirety.

FIELD

The present disclosure relates to an anomaly detection system and an anomaly detection method for detecting an anomaly in an in-vehicle network system.

BACKGROUND

Systems in automobiles in recent years include many devices called electronic control units (ECUs). A network connecting these ECUs is called an in-vehicle network. There are a number of standards for in-vehicle networks. One of the dominant standards for in-vehicle networks is Controller Area Network (CAN) defined by ISO 11898-1.

In CAN, a communication route is composed of two buses, and each ECU connected to a bus is referred to as a node. Each node connected to a bus transmits/receives messages called frames.

In CAN, no identifier indicating a transmission destination node or a transmission source node is used. Each transmission node transmits frames each with an ID called a message ID, and each reception node receives only frames with a predetermined message ID. There is thus a threat that an ECU is connected to a CAN bus and transmits a frame including an anomalous control command by impersonating an authorized ECU to unauthorizedly control the automobile.

To deal with such a threat, a method is proposed whereby a server system outside a vehicle is used to detect injection of an unauthorized message that is hard to be determined inside the vehicle (for example, Patent Literature (PTL) 1).

CITATION LIST

Patent Literature

PTL 1: Japanese Patent No. 6423402

SUMMARY

Technical Problem

However, the method in PTL 1 has a problem in that, in the case where communication to the server system outside the vehicle is deliberately interfered with or an anomaly that hinders communication to outside the vehicle occurs in the vehicle, the server system cannot be notified of information of an anomaly in the vehicle and cannot perform an appropriate anomaly detection process.

The present disclosure therefore has an object of providing an anomaly detection system, etc. that can notify information of an anomaly occurred in a vehicle to outside the vehicle more reliably.

Solution to Problem

An anomaly detection system according to an aspect of the present disclosure is an anomaly detection system in an in-vehicle network system that includes one or more electronic control units mounted on a vehicle and in which the vehicle and a specific offboard device are capable of communicating with each other through a plurality of communication routes, the anomaly detection system including: an anomaly detector that detects an anomaly in the vehicle; a determiner that determines, out of the plurality of communication routes, a communication route for transmitting anomaly detection result information indicating a result of detection of the anomaly in the vehicle to the specific offboard device, according to occurrence of a specific anomaly; and an anomaly detection result transmitter that transmits the anomaly detection result information to the specific offboard device using the communication route determined.

Advantageous Effects

According to the present disclosure, it is possible to notify information of an anomaly occurred in a vehicle to outside the vehicle more reliably.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a diagram illustrating an example of a structure of an ECU in Embodiment 1.

FIG. 3 is a diagram illustrating an example of a detection rule in Embodiment 1.

FIG. 4 is a diagram illustrating an example of a format of a detection result state message to inside a vehicle in Embodiment 1.

FIG. 5 is a diagram illustrating an example of a detection result management table in Embodiment 1.

FIG. 6 is a diagram illustrating an example of a structure of IVI in Embodiment 1.

FIG. 7 is a diagram illustrating an example of a structure of a communication ECU in Embodiment 1.

FIG. 19 is a diagram illustrating an example of a detection rule in Embodiment 2.

FIG. 20 is a diagram illustrating an example of a format of a detection result state message to inside a vehicle in Embodiment 2.

FIG. 21 is a diagram illustrating an example of a format of a detection result state message to outside the vehicle in Embodiment 2.

DESCRIPTION OF EMBODIMENTS

Figure 1:
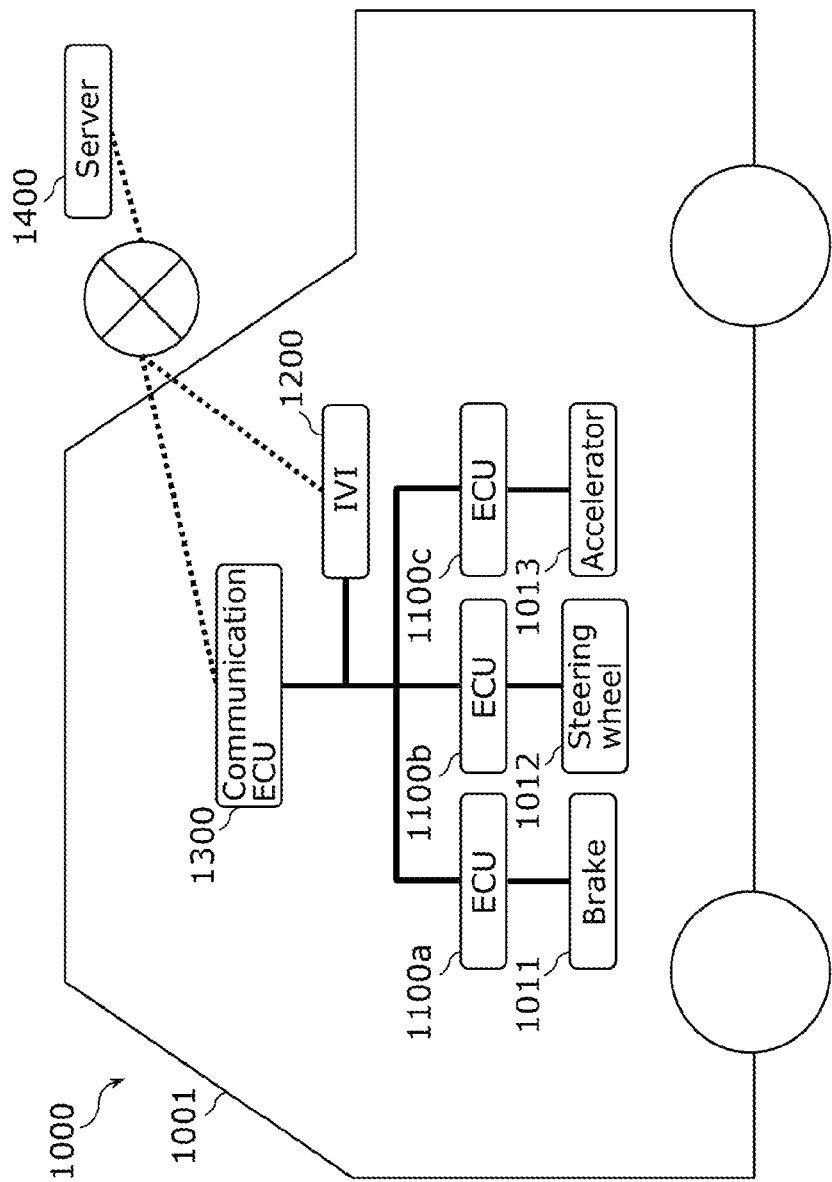
FIG. 1 is a diagram illustrating an example of an overall structure of an in-vehicle network system in Embodiment 1.

An anomaly detection system according to an aspect of the present disclosure is an anomaly detection system in an in-vehicle network system that includes one or more electronic control units mounted on a vehicle and in which the vehicle and a specific offboard device are capable of communicating with each other through a plurality of communication routes, the anomaly detection system including: an anomaly detector that detects an anomaly in the vehicle; a determiner that determines, out of the plurality of communication routes, a communication route for transmitting anomaly detection result information indicating a result of detection of the anomaly in the vehicle to the specific offboard device, according to occurrence of a specific anomaly; and an anomaly detection result transmitter that transmits the anomaly detection result information to the specific offboard device using the communication route determined.

With this, in the case where, when notifying anomaly detection result information about an anomaly that has occurred in the vehicle to an offboard system (specific offboard device), a specific anomaly that hinders communication through a communication route out of the plurality of communication routes set beforehand has occurred, another appropriate communication route can be determined, so that the anomaly detection result information can be notified to the specific offboard device using the communication route. The safety of the whole vehicle can thus be ensured. It is therefore possible to notify information of an anomaly occurred in a vehicle to outside the vehicle more reliably.

For example, the specific anomaly may include an anomaly in communication with outside of the vehicle.

With this, in the case where an anomaly has occurred in communication with the outside of the vehicle through a communication route out of the plurality of communication routes set beforehand, another appropriate communication route can be determined.

For example, the anomaly in the communication with the outside of the vehicle may include an anomaly in a process of transmission of the anomaly detection result information to the specific offboard device.

With this, the communication route can be determined by only the device relating to the transmission process, so that the time required to determine the communication route can be reduced.

For example, the anomaly in the communication with the outside of the vehicle may include an anomaly in a process of reception of the anomaly detection result information in the specific offboard device.

With this, a process for determination of a communication route need not be added to the device relating to the transmission process in the vehicle, with it being possible to save resources in the vehicle.

For example, the specific anomaly may include an anomaly in the vehicle.

With this, in the case where an anomaly that hinders communication to outside the vehicle has occurred in the vehicle, an appropriate communication route can be determined according to the occurred anomaly.

For example, the determiner may determine, out of the plurality of communication routes, the communication route for transmitting the anomaly detection result information to the specific offboard device, by checking the specific anomaly that has occurred against a table in which each type of anomaly is associated with a corresponding one of the plurality of communication routes.

With this, each possible anomaly is associated with a communication route according to, for example, the significance (such as severity or urgency) of the anomaly in the table. Accordingly, the communication route can be determined flexibly according to the significance of the anomaly.

For example, the anomaly detection system may further include: a changer that changes the association between the type of anomaly and the corresponding communication route in the table.

With this, the association between the types of anomalies and the communication routes in the table can be changed even after the vehicle is shipped.

For example, the plurality of communication routes may include a communication route via a telematics control unit (TCU).

With this, anomaly detection in a vehicle using telematics service or the like can be performed from outside the vehicle. The safety of the whole vehicle can thus be ensured.

For example, the plurality of communication routes may include a communication route via in-vehicle infotainment (IVI).

With this, anomaly detection in a vehicle using entertainment service or the like can be performed from outside the vehicle. The safety of the whole vehicle can thus be ensured.

For example, the plurality of communication routes may include a communication route via an electronic control unit that handles charging of a battery.

With this, anomaly detection in an electric automobile or a plug-in hybrid vehicle having a battery device can be performed from outside the vehicle. The safety of the whole vehicle can thus be ensured.

For example, the determiner may determine, out of the plurality of communication routes, the communication route for transmitting the anomaly detection result information to the specific offboard device, according to the occurrence of the specific anomaly and a state of the vehicle.

With this, an appropriate communication route can be determined according to the current state of the vehicle. The safety of the whole vehicle can thus be ensured.

For example, the anomaly detection system may further include: a communication route transmitter that transmits communication route information indicating the communication route determined.

With this, the communication route determined in response to the occurrence of the specific anomaly can be confirmed, for example, through a web browser.

An anomaly detection method according to an aspect of the present disclosure is an anomaly detection method in an in-vehicle network system that includes one or more electronic control units mounted on a vehicle and in which the vehicle and a specific offboard device are capable of communicating with each other through a plurality of communication routes, the anomaly detection method including: detecting an anomaly in the vehicle; determining, out of the plurality of communication routes, a communication route for transmitting anomaly detection result information indicating a result of detection of the anomaly in the vehicle to the specific offboard device, according to occurrence of a specific anomaly; and transmitting the anomaly detection result information to the specific offboard device using the communication route determined.

It is therefore possible to provide an anomaly detection method that can notify information of an anomaly occurred in a vehicle to outside the vehicle more reliably.

An anomaly detection system according to embodiments of the present disclosure will be described below, with reference to drawings. The embodiments described below each show a preferable specific example of the present disclosure. The numerical values, shapes, materials, structural elements, the arrangement and connection of the structural elements, steps, the processing order of the steps etc. shown in the following embodiments are mere examples of the present disclosure, and do not limit the scope of the present disclosure.

The present disclosure is defined based on the scope of the claims. Of the structural elements in the embodiments described below, the structural elements not recited in any one of the independent claims representing the broadest concepts are not necessarily required in order to achieve the object of the present disclosure but are described as structural elements constituting preferable embodiments.

Embodiment 1

[1. Structure of System]

In-vehicle network system 1000 will be described below as Embodiment 1 of the present disclosure, with reference to drawings.

[1.1 Overall Structure of In-Vehicle Network System 1000]

FIG. 1 is a diagram illustrating an example of an overall structure of in-vehicle network system 1000 in Embodiment 1.

In-vehicle network system 1000 includes vehicle 1001 and server 1400 that is connected to vehicle 1001 via a network and operates. In in-vehicle network system 1000, one or more ECUs are mounted on vehicle 1001. In-vehicle network system 1000 includes an anomaly detection system.

The anomaly detection system is a computer including a processor, a communication interface, memory, and the like. The memory is read only memory (ROM), random access memory (Random Access Memory), etc., and can store programs executed by the processor. The structural elements included in the anomaly detection system are implemented by the processor executing the programs stored in the memory, the communication interface, and the like. The anomaly detection system may be a device implemented by one housing. The structural elements in the anomaly detection system may be distributed between a plurality of devices (a plurality of housings).

Vehicle 1001 includes ECUs 1100a, 1100b, and 1100c connected via any type of in-vehicle network, brake 1011, steering wheel 1012, and accelerator 1013 that are subject to control respectively by ECUs 1100a to 1100c, and IVI 1200 and communication ECU 1300 that communicate with ECUs 1100a to 1100c via the in-vehicle network.

ECUs 1100a to 1100c transmit and receive communication messages with one another via the in-vehicle network, thus controlling the vehicle. For example, CAN is used as the in-vehicle network. ECUs 1100a to 1100c are hereafter also collectively referred to as "ECU 1100".

IVI 1200 includes a display capable of displaying the state in vehicle 1001, and presents each type of information indicating the state in vehicle 1001 to a driver. IVI 1200 also communicates with server 1400, and effects transmission and reception of messages between server 1400 and other ECUs in vehicle 1001. IVI 1200 may be capable of communicating with other devices outside the vehicle beside server 1400.

Communication ECU 1300 communicates with server 1400, and effects transmission and reception of messages between server 1400 and other ECUs in vehicle 1001. Communication ECU 1300 is an example of a TCU.

Server 1400 remotely monitors vehicle 1001 to ensure the safety of the vehicle. Moreover, server 1400 may analyze messages transmitted from vehicle 1001 to detect any unauthorized message that is hard to be determined in vehicle 1001. Server 1400 is an example of a specific offboard device.

In in-vehicle network system 1000, vehicle 1001 and server 1400 are capable of communicating with each other through a plurality of communication routes, as illustrated in FIG. 1. For example, the plurality of communication routes include a communication route via communication ECU 1300 (TCU) and a communication route via IVI 1200.

[1.2 Structure of ECU 1100]

FIG. 2 is a diagram illustrating an example of a structure of ECU 1100 in Embodiment 1. ECU 1100 includes communicator 1101, message converter 1102, start manager 1103, cryptographic processor 1104, key manager 1105, detection result manager 1106, and detection result holder 1107.

Communicator 1101 communicates with various sensors, and communicates with other ECUs via the in-vehicle network. Communicator 1101 notifies message converter 1102 of received messages and sensor values. Communicator 1101 transmits messages notified from message converter 1102 or detection result manager 1106 to other ECUs or various sensors.

Message converter 1102 converts sensor values notified from communicator 1101 based on the format of the in-vehicle network, and transmits them to other ECUs via communicator 1101. Message converter 1102 also converts communication messages received from communicator 1101 into sensor values or configuration information, and transmits them to various sensors via communicator 1101. Message converter 1102 notifies cryptographic processor 1104 of received messages.

Start manager 1103 handles a start process of ECU 1100 and a start process of each function of ECU 1100. In the case where, at the time of start, the validity of the details of the start needs to be checked, start manager 1103 notifies cryptographic processor 1104 of the need.

Cryptographic processor 1104 verifies a message authentication code (MAC) included in each message using a key or a certificate held in key manager 1105, and notifies detection result manager 1106 of the result. Moreover, in response to notification from start manager 1103, cryptographic processor 1104 checks the validity of the device or function at the time of start, and notifies detection result manager 1106 of the result. Cryptographic processor 1104 is an example of an anomaly detector that detects an anomaly (for example, an anomaly caused by an attack or an anomaly caused by a failure) in vehicle 1001.

Key manager 1105 holds keys and certificates used in cryptographic processor 1104.

Detection result manager 1106 stores the result of detection of an anomaly in vehicle 1001 notified from cryptographic processor 1104, in detection result holder 1107 together with peripheral information. Detection result manager 1106 also transmits the information held in detection result holder 1107 to communication ECU 1300 via communicator 1101 as a detection result state message (also referred to as "anomaly detection result information"). An example of a detection rule when detecting an anomaly in vehicle 1001 is illustrated in FIG. 3. An example of the message format of the detection result state message is illustrated in FIG. 4.

Detection result holder 1107 holds detection result data notified from detection result manager 1106. In response to a read instruction from detection result manager 1106, detection result holder 1107 notifies detection result manager 1106 of the detection result data. An example of the data held in detection result holder 1107 is illustrated in FIG. 5.

[1.3 Example of Detection Rule]

FIG. 3 is a diagram illustrating an example of the detection rule for detecting an anomaly of a message in the in-vehicle network in Embodiment 1. As illustrated in FIG. 3, the detection rule includes a table in which specific details of each anomaly detected and an error ID corresponding to the anomaly are associated with each other. In the case where an anomaly in the table occurs, the corresponding error ID and peripheral information are held as a detection result.

[1.4 Example of Format of Detection Result State Message to Inside of Vehicle]

FIG. 4 is a diagram illustrating an example of the format of the detection result state message to inside the vehicle in Embodiment 1. A payload of the detection result state message to inside the vehicle (that is, the detection result state message transmitted to the in-vehicle network) includes detection result header D1101, detector ID D1102, error ID D1103, and detection result payload D1104.

Detection result header D1101 is a region for storing the type and number of items of data that follows. With a predetermined number at the beginning, detection result header D1101 represents that the data that follows is a message indicating a detection result state and informs a receiver of the contents.

Detector ID D1102 stores a numeric set uniquely to identify an anomaly detector among ECUs 1100a to 1100c.

Error ID D1103 indicates the type of the anomaly included in the detection result from the anomaly detector identified in detector ID D1102.

Detection result payload D1104 indicates error peripheral information.

A plurality of error IDs may be included in one message, as illustrated in the drawing.

[1.5 Example of Detection Result Management Table]

FIG. 5 is a diagram illustrating an example of a detection result management table in Embodiment 1. For example, detection result manager 1106 generates the detection result management table based on the detection result state message to inside the vehicle, and stores the generated detection result management table in detection result holder 1107. The detection result management table includes an error ID corresponding to each anomaly detected by cryptographic processor 1104, the time of occurrence of the anomaly, and detection result payload data that is peripheral information.

[1.6 Structure of IVI 1200]

FIG. 6 is a diagram illustrating an example of a structure of IVI 1200 in Embodiment 1. IVI 1200 includes in-vehicle communicator 1201, converter 1202, offboard communicator 1203, and display 1204.

In-vehicle communicator 1201 notifies converter 1202 of messages received from other ECUs in the vehicle. In-vehicle communicator 1201 also transmits messages notified from converter 1202, to other ECUs in the vehicle. In-vehicle communicator 1201 further notifies display 1204 of information that needs to be notified to the driver.

Converter 1202 converts data that needs to be transferred out of messages received via one of in-vehicle communicator 1201 and offboard communicator 1203 into a predetermined format, and transmits the converted data to the other one of in-vehicle communicator 1201 and offboard communicator 1203.

Offboard communicator 1203 notifies converter 1202 of messages received from server 1400. Offboard communicator 1203 also transmits messages notified from converter 1202, to server 1400. Offboard communicator 1203 further notifies display 1204 of information that needs to be notified to the driver. Offboard communicator 1203 serves as an anomaly detection result transmitter that, in the case where a communication route between IVI 1200 and server 1400 is determined out of the plurality of communication routes, transmits anomaly detection result information to server 1400 using the determined communication route.

Display 1204 is notified of information from in-vehicle communicator 1201 or offboard communicator 1203, and presents information necessary for the driver based on the notified information.

[1.7 Structure of Communication ECU 1300]

FIG. 7 is a diagram illustrating an example of a structure of communication ECU 1300 in Embodiment 1. Communication ECU 1300 includes in-vehicle communicator 1301, converter 1302, offboard communicator 1303, and switcher 1304.

In-vehicle communicator 1301 notifies converter 1302 of messages received from other ECUs in the vehicle. In-vehicle communicator 1301 also transmits messages notified from converter 1302, to other ECUs in the vehicle.

Converter 1302 converts data that needs to be transferred out of messages received via one of in-vehicle communicator 1301 and offboard communicator 1303 into a predetermined format, and transmits the converted data to the other one of in-vehicle communicator 1301 and offboard communicator 1303. Converter 1302 also receives a notification from switcher 1304, converts the notified information, and notifies in-vehicle communicator 1301 of the information.

Figure 8:
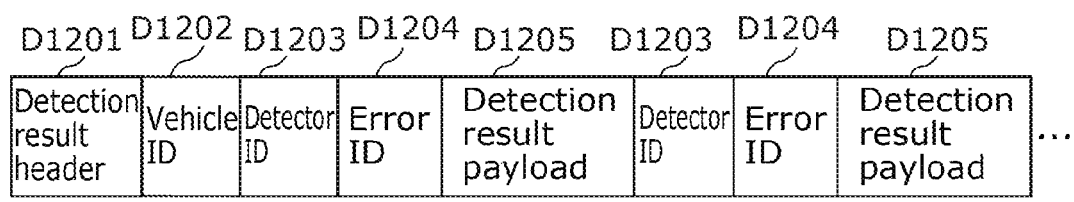
FIG. 8 is a diagram illustrating an example of a format of a detection result state message to outside the vehicle in Embodiment 1.

Offboard communicator 1303 notifies converter 1302 of messages received from server 1400. Offboard communicator 1303 also transmits messages notified from converter 1302, to server 1400. In the case where a communication error occurs, offboard communicator 1303 notifies switcher 1304 of information (specifically, detection result state message (anomaly detection result information)) to be transmitted to server 1400. An example of the message format of the detection result state message transmitted to server 1400 is illustrated in FIG. 8. Offboard communicator 1303 serves as an anomaly detection result transmitter that, in the case where a communication route between communication ECU 1300 and server 1400 is determined out of the plurality of communication routes, transmits anomaly detection result information to server 1400 using the determined communication route.

Switcher 1304, having received the notification of the information to be transmitted to server 1400 from offboard communicator 1303, notifies converter 1302 of the information to be transmitted to server 1400 in order to notify the information to an ECU that includes a offboard communicator capable of communicating with server 1400 using a communication route other than the communication route currently used to communicate with server 1400. Switcher 1304 is an example of a determiner that determines, out of the plurality of communication routes, a communication route for transmitting anomaly detection result information indicating a result of detection of an anomaly in vehicle 1001 to server 1400 according to occurrence of a specific anomaly. Switcher 1304 switches the communication route used for communication between vehicle 1001 and server 1400 to the determined communication route.

[1.8 Example of Format of Detection Result State Message to Outside of Vehicle]

FIG. 8 is a diagram illustrating an example of the format of the detection result state message to outside the vehicle in Embodiment 1. A payload of the detection result state message to outside the vehicle (that is, the detection result state message transmitted to server 1400) includes detection result header D1201, vehicle ID D1202, detector ID D1203, error ID D1204, and detection result payload D1205.

Detection result header D1201 is a region for storing the type and number of items of data that follows. With a predetermined number at the beginning, detection result header D1201 represents that the data that follows is a message indicating a detection result state and informs a receiver of the contents.

Vehicle ID D1202 stores a numeric set uniquely to identify vehicle 1001.

Detector ID D1203 stores a numeric set uniquely to identify an anomaly detector among ECUs 1100a to 1100c.

Error ID D1204 indicates the type of the anomaly included in the detection result from the anomaly detector identified in detector ID D1203.

Detection result payload D1205 indicates the result of determining the detection result state.

The detection result state message to outside the vehicle has vehicle ID D1202 added to the detection result state message to inside the vehicle so that server 1400 can identify which vehicle the message is from.

A plurality of detector IDs and a plurality of error IDs may be included in one message, as illustrated in the drawing.

[1.9 Structure of Server 1400]

Figure 9:
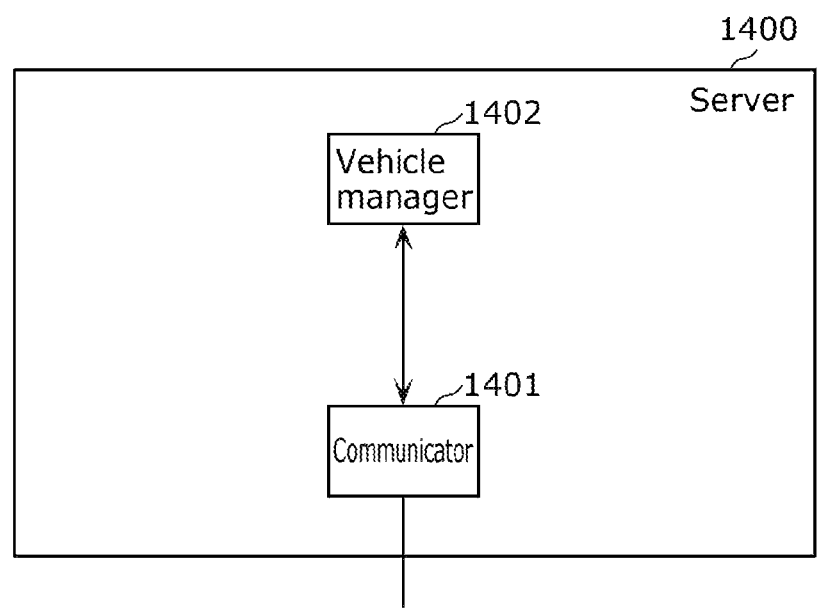
FIG. 9 is a diagram illustrating an example of a structure of a server in Embodiment 1.

FIG. 9 is a diagram illustrating an example of a structure of server 1400 in Embodiment 1. Server 1400 includes communicator 1401 and vehicle manager 1402.

Communicator 1401 communicates with vehicle 1001, and notifies vehicle manager 1402 of received messages. Communicator 1401 also transmits notifications from vehicle manager 1402 to vehicle 1001.

Vehicle manager 1402 communicates with vehicle 1001 via communicator 1401, and manages information in vehicle 1001. For example, vehicle manager 1402 may analyze each message transmitted from vehicle 1001 to detect any unauthorized message.

[1.10 Example of Anomaly Information Communication Process Sequence]

Figure 10:
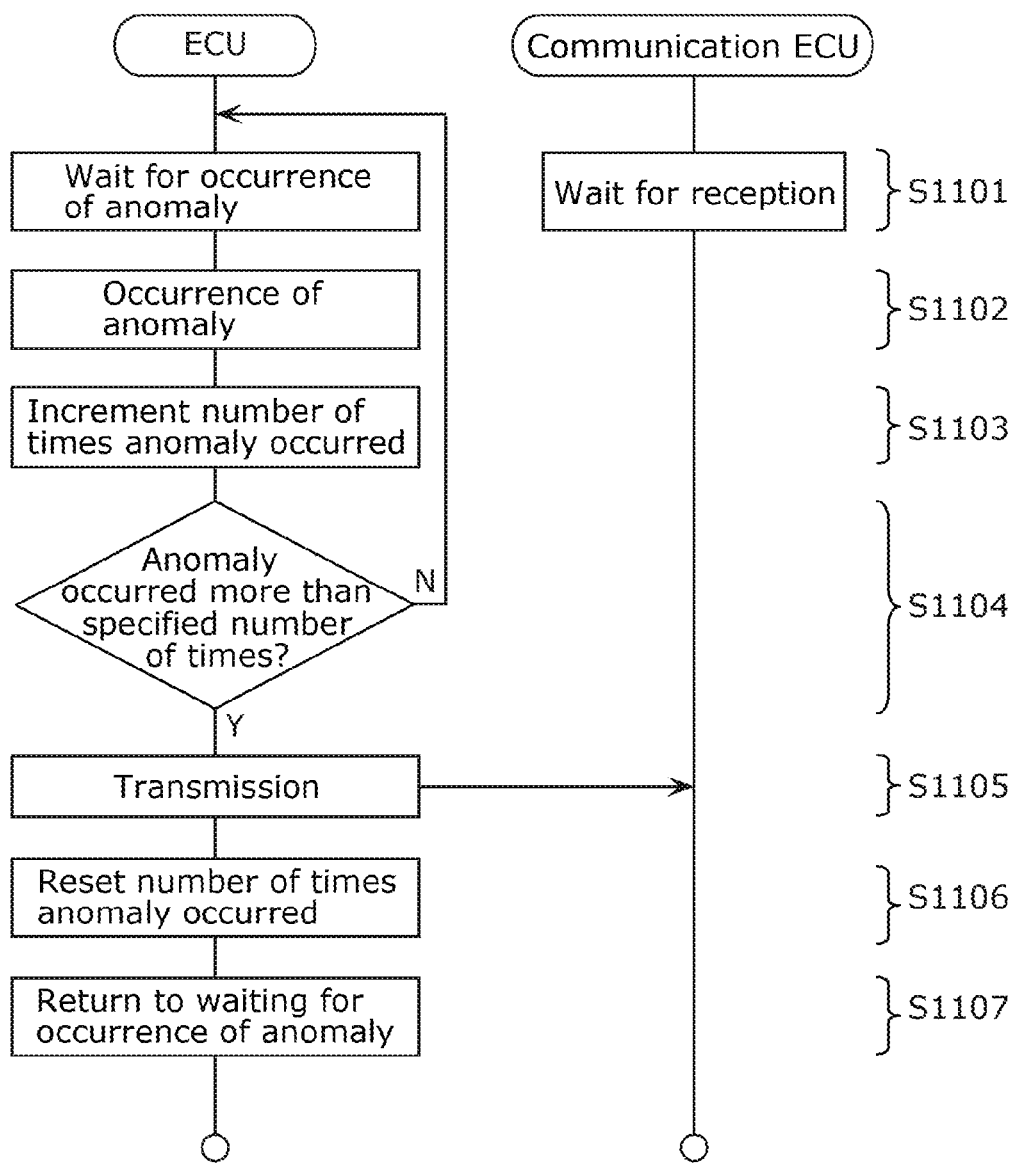
FIG. 10 is a diagram illustrating an example of a sequence relating to an anomaly information communication process in Embodiment 1.

FIG. 10 is a diagram illustrating an example of a sequence relating to an anomaly information communication process in Embodiment 1. FIG. 10 illustrates an example of a sequence in which ECU 1100 summarizes anomaly information and notifies it to communication ECU 1300.

(S1101) ECU 1100 waits for occurrence of an anomaly, and communication ECU 1300 waits for communication (reception of notification from ECU 1100).

(S1102) An anomaly occurs in vehicle 1001, and ECU 1100 detects the anomaly.

(S1103) ECU 1100 increments a counter value indicating the number of times the anomaly occurred, by 1.

(S1104) ECU 1100 determines whether the counter value of the anomaly is greater than a number specified beforehand (i.e. whether the anomaly occurred more than the specified number of times). In the case where the counter value of the anomaly is greater than the specified number, the process advances to S1105. In the case where the counter value of the anomaly is not greater than the specified number, the process advances to S1101. For example, the specified number of times is set for each type of anomaly. The number of times set is not limited, and is set, for example, according to the type of anomaly.

(S1105) ECU 1100 transmits information (anomaly detection result information) obtained by summarizing the details of the occurred anomaly, to communication ECU 1300.

(S1106) ECU 1100 resets the counter value of the anomaly.

(S1107) ECU 1100 completes the series of processes, and returns to S1101.

[1.11 Example of Anomaly Information Transmission Route Switching Process Sequence]

Figure 11:
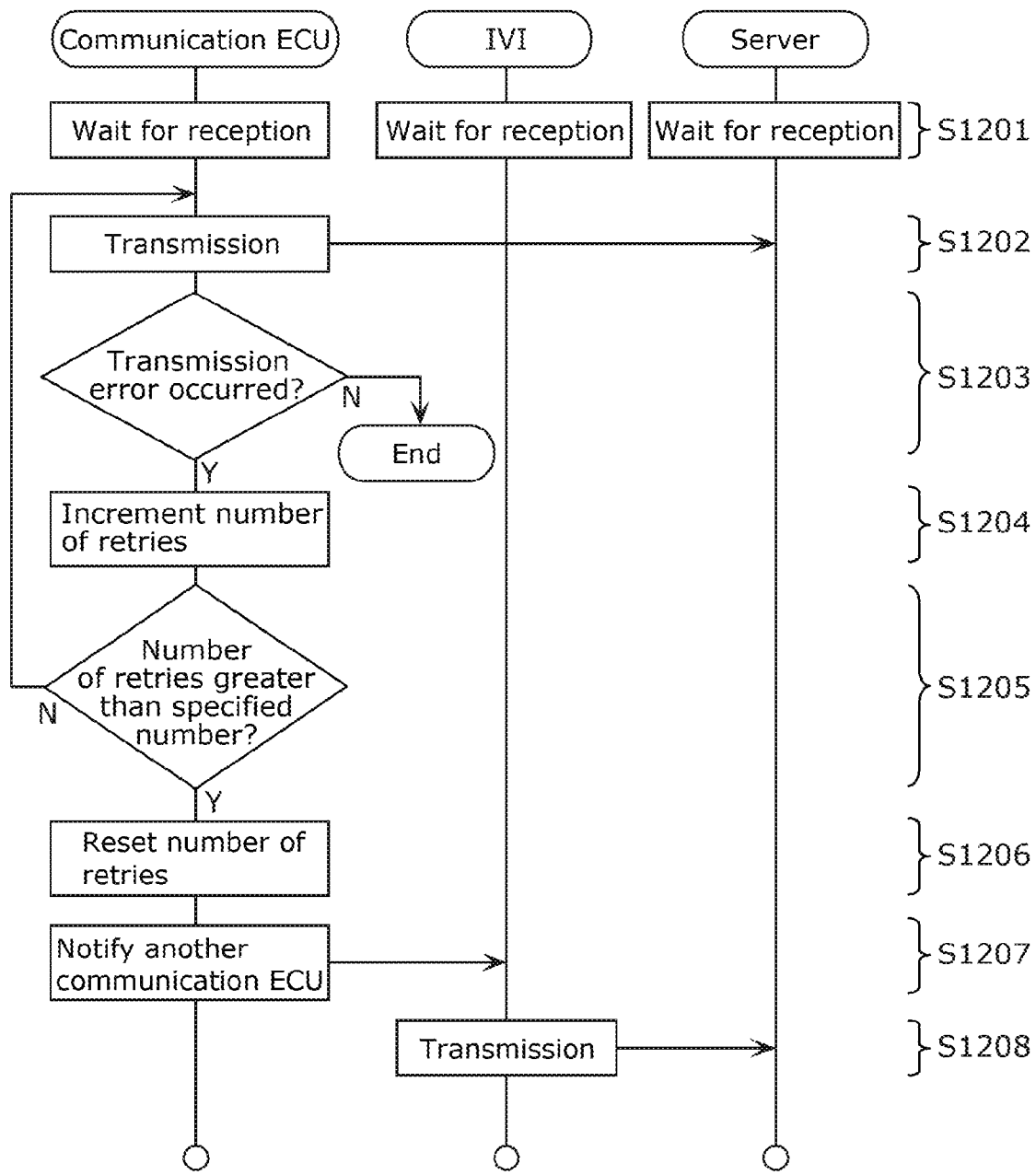
FIG. 11 is a diagram illustrating an example of a sequence relating to an anomaly information transmission route switching process in Embodiment 1.

FIG. 11 is a diagram illustrating an example of a sequence relating to an anomaly information transmission route switching process in Embodiment 1. FIG. 11 illustrates an example of a sequence of a process in which, in the case where a transmission error as the specific anomaly occurs when communication ECU 1300 transmits anomaly detection result information to server 1400, the communication route is switched to a communication route via IVI 1200 (that is, the communication route via IVI 1200 is determined out of the plurality of communication routes) and the anomaly detection result information is transmitted from IVI 1200.

(S1201) Communication ECU 1300 waits for communication (reception of notification from ECU 1100), IVI 1200 waits for communication (reception of notification from communication ECU 1300), and server 1400 waits for communication (reception of notification from communication ECU 1300 or IVI 1200).

(S1202) Communication ECU 1300 transmits received anomaly detection result information to server 1400.

(S1203) Communication ECU 1300 determines whether a transmission error as the specific anomaly has occurred. In the case where the transmission error as the specific anomaly has not occurred, the process ends normally. In the case where the transmission error as the specific anomaly has occurred, the process advances to S1204. Thus, for example, the specific anomaly includes an anomaly in the communication with the outside of vehicle 1001 (for example, server 1400), and the anomaly in the communication with the outside of the vehicle includes an anomaly in the process of transmission of the anomaly detection result information to server 1400.

(S1204) Communication ECU 1300 increments a counter value relating to the number of times the transmission was retried, by 1.

(S1205) Communication ECU 1300 determines whether the number of times the transmission was retried (i.e. the counter value) is greater than a specified number. In the case where the number of retries is greater than the specified number, the process advances to S1206. In the case where the number of retries is not greater than the specified number, the process advances to S1202. The specified number is not limited and is set as appropriate.

(S1206) Communication ECU 1300 resets the counter value relating to transmission retries.

(S1207) Communication ECU 1300 notifies another communication ECU (IVI 1200 in this example) of the anomaly detection result information which communication ECU 1300 tried to transmit to server 1400.

(S1208) IVI 1200 transmits the anomaly detection result information received from communication ECU 1300, to server 1400.

Effects in Embodiment 1

In in-vehicle network system 1000 in Embodiment 1, in the case where an anomaly has occurred in the communication of an ECU (for example, communication ECU 1300) that handles communication with outside the vehicle in the network system of vehicle 1001 when notifying information about an anomaly that has occurred in the vehicle to an offboard system (for example, server 1400), the information about the anomaly can be appropriately notified to the offboard system by setting beforehand, as an alternative, a communication route via another communication ECU for communicating with outside the vehicle (for example, IVI 1200). The safety of the whole vehicle can thus be ensured.

Variation 1 of Embodiment 1

Although Embodiment 1 describes an example in which an ECU that handles communication with outside the vehicle in the network system of vehicle 1001 detects a communication anomaly and as a result determines an appropriate communication route in in-vehicle network system 1000, an offboard system may determine the communication anomaly and change the communication route. Server 11400 that differs in structure from Embodiment 1 will be mainly described below, while omitting the description of the same elements as those in Embodiment 1.

[1.12 Structure of Server 11400]

Figure 12:
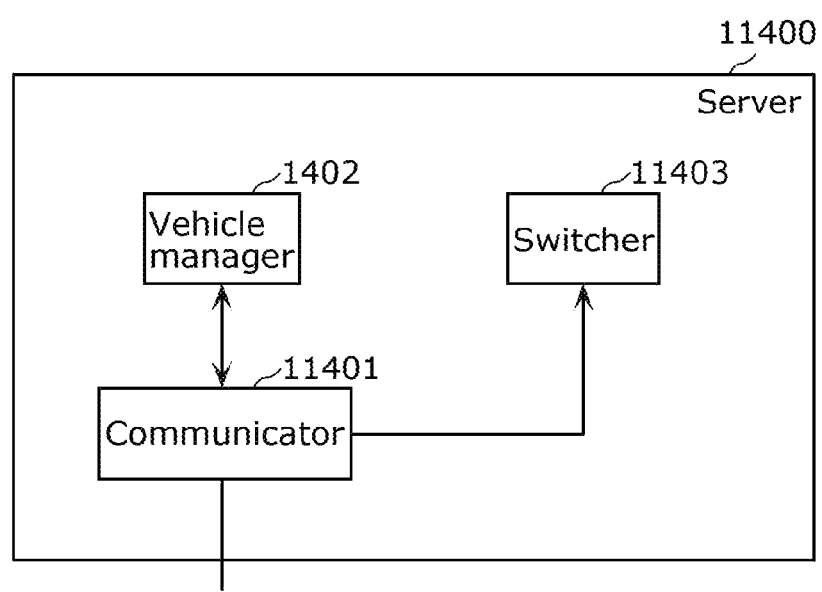
FIG. 12 is a diagram illustrating an example of a structure of a server in Variation 1 of Embodiment 1.

FIG. 12 is a diagram illustrating an example of a structure of server 11400 in Variation 1 of Embodiment 1. Server 11400 includes communicator 11401, vehicle manager 1402, and switcher 11403. The same structures as those in Embodiment 1 are given the same reference signs and their description is omitted.

Communicator 11401 communicates with vehicle 1001, and notifies vehicle manager 1402 of received messages. Communicator 1401 also transmits notifications from vehicle manager 1402 to vehicle 1001. In the case where a communication error has occurred, communicator 11401 notifies switcher 11403 of the communication error.

Switcher 11403, having received the notification from communicator 11401, notifies communicator 11401 to communicate with an ECU that includes a offboard communicator capable of communicating with server 11400 using a communication route other than the communication route currently used to communicate with the vehicle. Switcher 11403 is an example of a determiner that determines, out of the plurality of communication routes, a communication route for transmitting anomaly detection result information indicating a result of detection of an anomaly in the vehicle to server 11400 according to occurrence of a specific anomaly. Switcher 11403 switches the communication route used for communication between the vehicle and server 11400 to the determined communication route.

[1.13 Example of Anomaly Information Transmission Route Switching Process Sequence]

Figure 13:
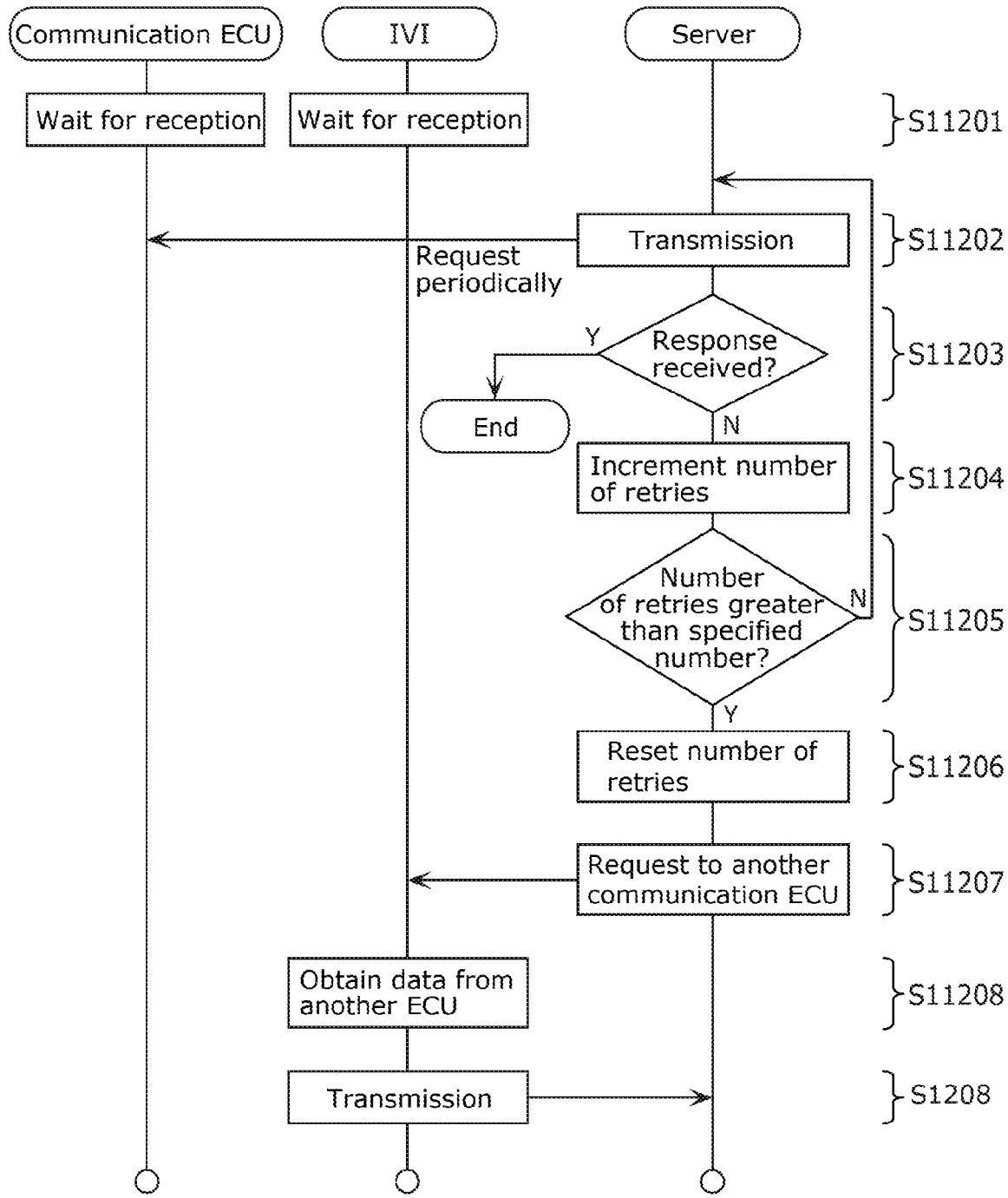
FIG. 13 is a diagram illustrating an example of a sequence relating to an anomaly information transmission route switching process in Variation 1 of Embodiment 1.

FIG. 13 is a diagram illustrating an example of a sequence relating to an anomaly information transmission route switching process in Variation 1 of Embodiment 1. FIG. 13 illustrates an example of a sequence of a process in which, in the case where a communication error as the specific anomaly occurs when server 11400 requests anomaly detection result information from communication ECU 1300, the request destination is switched to IVI 1200 (that is, the communication route via IVI 1200 is determined out of the plurality of communication routes) and the anomaly detection result information is transmitted from IVI 1200. The same steps as those in Embodiment 1 are given the same reference signs and their description is omitted.

(S11201) Communication ECU 1300 and IVI 1200 wait for reception from server 11400.

(S11202) Server 11400 periodically requests anomaly detection result information from communication ECU 1300.

(S11203) Server 11400 determines whether a response to the request has been received successfully. In the case where the response has been received successfully, the process ends normally. In the case where the response has not been received successfully, the process advances to S11204. Thus, for example, the specific anomaly includes an anomaly in the communication with the outside of vehicle 1001 (for example, server 11400), and the anomaly in the communication with the outside of the vehicle includes an anomaly in the process of reception of the anomaly detection result information in server 11400.

(S11204) Server 11400 increments a counter value relating to the number of times the request was retried, by 1.

(S11205) Server 11400 determines whether the number of times the request was retried (i.e. the counter value) is greater than a specified number. In the case where the number of retries is greater than the specified number, the process advances to S11206. In the case where the number of retries is not greater than the specified number, the process advances to S11202.

(S11206) Server 11400 resets the counter value relating to request retries.

(S11207) Server 11400 switches the request destination of the anomaly detection result information from communication ECU 1300 to IVI 1200, and transmits the request.

(S11208) IVI 1200 requests the anomaly detection result information from another ECU (for example, ECU 1100) and obtains the anomaly detection result information, in response to the received request.

Effects in Variation 1 of Embodiment 1

In the in-vehicle network system in Variation 1 of Embodiment 1, an offboard system (for example, server 11400) detects an anomaly in an ECU (for example, communication ECU 1300) that handles communication with outside the vehicle in the network system of vehicle 1001 when notifying information about an anomaly that has occurred in the vehicle to the offboard system, so that the offboard system can appropriately obtain the information about the anomaly. The safety of whole vehicle 1001 can thus be ensured. Further, the structural element involved in the determination and switching of the communication route in vehicle 1001 can be omitted, with it being possible to save resources in vehicle 1001. Both the offboard system and vehicle 1001 may include the structural element involved in the determination and switching of the communication route.

Variation 2 of Embodiment 1

Although Embodiment 1 describes an example in which an ECU that handles communication with outside the vehicle in the network system of vehicle 1001 detects a communication anomaly and as a result determines an appropriate communication route in in-vehicle network system 1000, whether to change the communication route may be determined further according to the state of the vehicle. Communication ECU 11300 that differs in structure from Embodiment 1 will be mainly described below, while omitting the description of the same elements as those in Embodiment 1.

[1.14 Structure of Communication ECU 11300]

Figure 14:
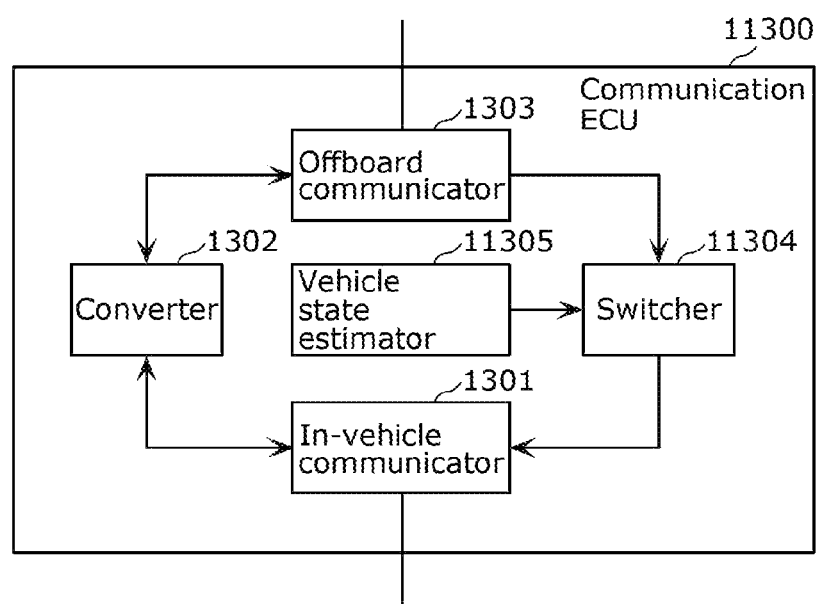
FIG. 14 is a diagram illustrating an example of a structure of a communication ECU in Variation 2 of Embodiment 1.

FIG. 14 is a diagram illustrating an example of a structure of communication ECU 11300 in Variation 2 of Embodiment 1. Communication ECU 11300 includes in-vehicle communicator 1301, converter 1302, offboard communicator 1303, switcher 11304, and vehicle state estimator 11305. The same structures as those in Embodiment 1 are given the same reference signs and their description is omitted.

Switcher 11304 obtains the current vehicle state from vehicle state estimator 11305. Switcher 11304 also receives notification of information to be transmitted to a server (for example, server 1400), from offboard communicator 1303. In the case where the obtained current vehicle state is a specific vehicle state, switcher 11304 notifies in-vehicle communicator 1301 of the information to be transmitted to server 1400 in order to notify the information to an ECU that includes a offboard communicator capable of communicating with server 1400 using a communication route other than the communication route currently used to communicate with server 1400. Switcher 11304 is an example of a determiner that determines, out of the plurality of communication routes, a communication route for transmitting anomaly detection result information to server 1400 according to occurrence of a specific anomaly and the state of the vehicle. Switcher 11304 switches the communication route used for communication between the vehicle and server 1400 to the determined communication route.

Vehicle state estimator 11305 estimates the current vehicle state, and notifies switcher 11304 of the estimated vehicle state. The estimated vehicle state is not limited and is set as appropriate.

[1.15 Example of Anomaly Information Transmission Route Switching Process Sequence]

Figure 15:
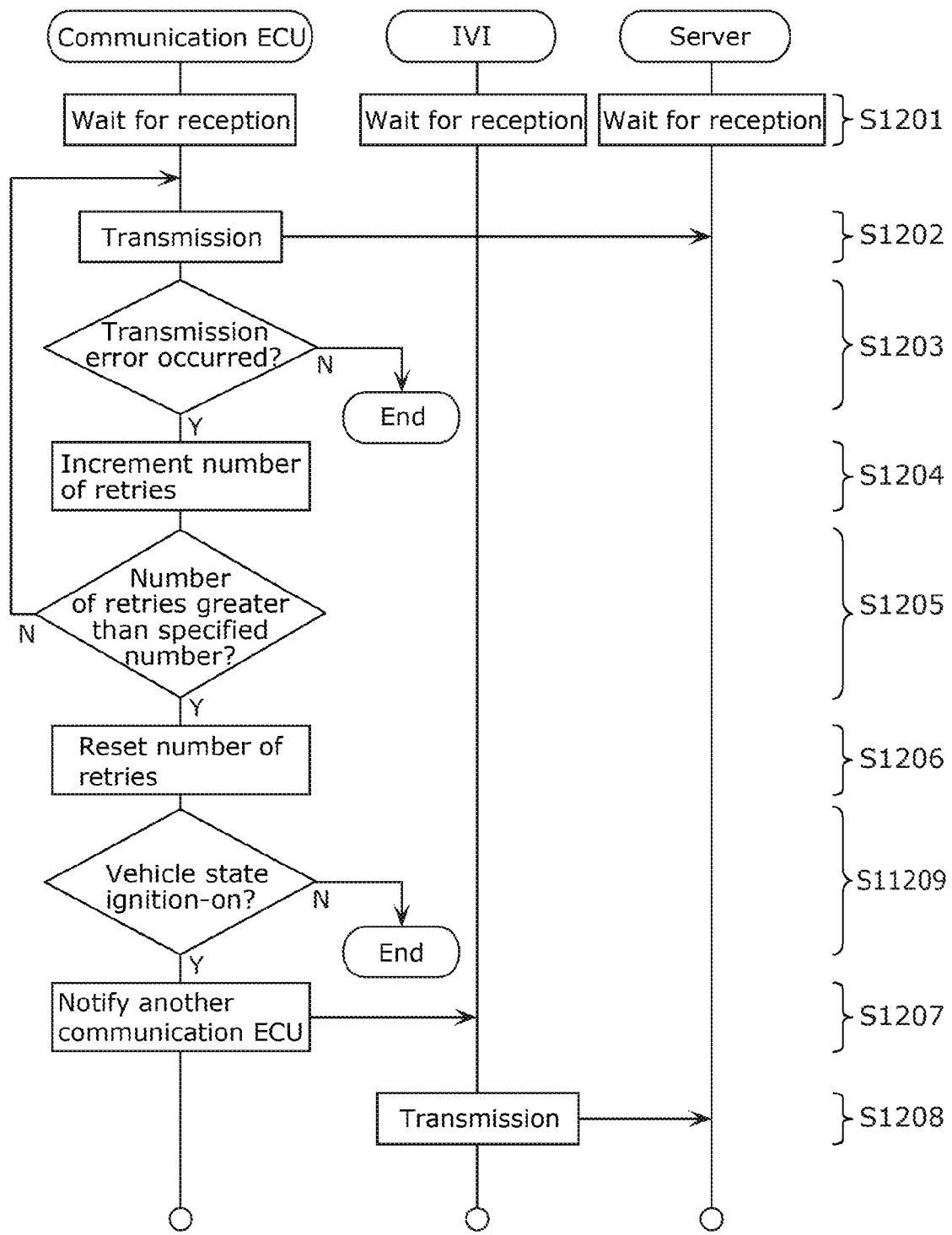
FIG. 15 is a diagram illustrating an example of a sequence relating to an anomaly information transmission route switching process in Variation 2 of Embodiment 1.

FIG. 15 is a diagram illustrating an example of a sequence relating to an anomaly information transmission route switching process in Variation 2 of Embodiment 1. FIG. 15 illustrates an example of a sequence of a process in which, only in the case where a transmission error as the specific anomaly occurs and the current vehicle state is the specific vehicle state when communication ECU 11300 transmits anomaly detection result information to server 1400, the communication route is switched to a communication route via IVI 1200 and the anomaly detection result information is transmitted from IVI 1200. The same steps as those in Embodiment 1 are given the same reference signs and their description is omitted.

(S11209) Communication ECU 11300 determines whether the vehicle state is a predetermined state (for example, ignition-on). In the case where the vehicle state is the predetermined state, the process advances to S1207. In the case where the vehicle state is not the predetermined state, the process ends. When the vehicle state is ignition-off, the vehicle is assumed to be stopped. Since there is likely no need to immediately transmit detection result information from another ECU including a offboard communicator, the process ends without transmitting anomaly detection result information to server 1400.

Effects in Variation 2 of Embodiment 1

In the in-vehicle network system in Variation 2 of Embodiment 1, in the case where, in a specific vehicle state, an anomaly has occurred in an ECU (for example, communication ECU 11300) that handles communication with outside the vehicle in the network system of the vehicle when notifying information about an anomaly that has occurred in the vehicle to an offboard system (for example, server 1400), the information about the anomaly can be appropriately notified to the offboard system by setting beforehand, as an alternative, another communication ECU for communicating with outside the vehicle (for example, IVI 1200). The safety of the whole vehicle can thus be ensured. By setting beforehand the specific vehicle state in which communication using another communication ECU for communicating with outside the vehicle is allowed, a communication error can be further avoided.

Embodiment 2

Embodiment 1 describes an example in which the communication route is switched in the case where an anomaly in communication as a specific anomaly occurs when notifying an offboard system of information about an anomaly that has occurred in the vehicle in in-vehicle network system 1000, but the present disclosure is not limited to such. For example, given that, when an anomaly high in significance occurs in the vehicle, there is a high likelihood that an anomaly has already occurred in other functions including a vehicle outside communication function, the communication route to the offboard system may be switched regardless of whether an anomaly in communication occurs. This will be described below, with reference to drawings. Here, the description of the same elements as those in Embodiment 1 is omitted.

[2. Structure of System]

In-vehicle network system 2000 will be described below as Embodiment 2 of the present disclosure, with reference to drawings. The same structures as those in Embodiment 1 are given the same reference signs and their description is omitted.

[2.1 Overall Structure of In-Vehicle Network System 2000]

Figure 16:
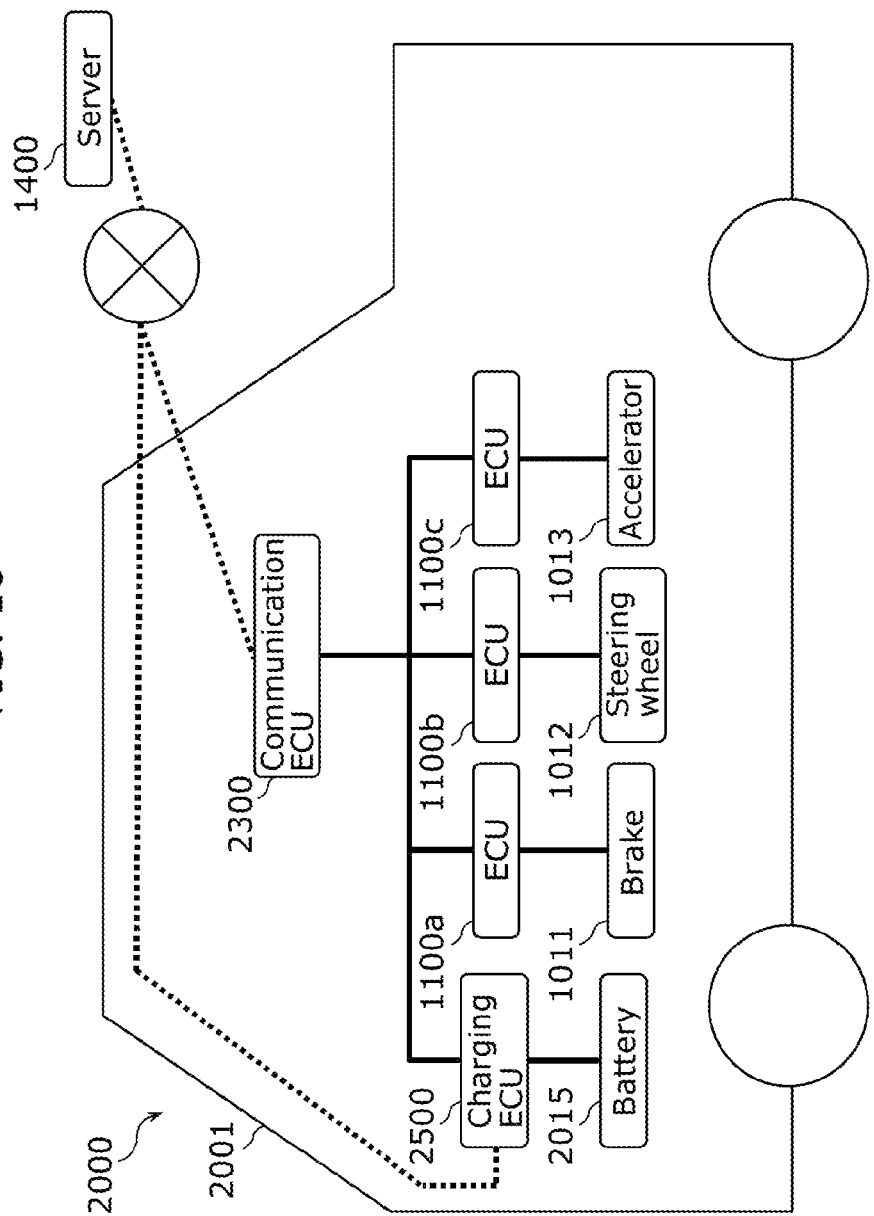
FIG. 16 is a diagram illustrating an example of an overall structure of an in-vehicle network system in Embodiment 2.

FIG. 16 is a diagram illustrating an example of an overall structure of in-vehicle network system 2000 in Embodiment 2.

In-vehicle network system 2000 includes vehicle 2001 and server 1400 that is connected to vehicle 2001 via a network and operates. In in-vehicle network system 2000, one or more ECUs are mounted on vehicle 2001. In-vehicle network system 2000 includes an anomaly detection system.

Vehicle 2001 includes ECUs 1100a, 1100b, and 1100c (ECUs 1100) connected via any type of in-vehicle network, brake 1011, steering wheel 1012, and accelerator 1013 that are subject to control by respective ECUs 1100, communication ECU 2300 that communicates with ECUs 1100 via the in-vehicle network, battery 2015 as a power source of the vehicle, and charging ECU 2500 that handles charging of battery 2015.

Communication ECU 2300 communicates with server 1400, and effects transmission and reception of messages between server 1400 and other ECUs in vehicle 2001. Communication ECU 2300 is an example of a TCU.

Charging ECU 2500 is connected to offboard charging equipment (not illustrated), and handles a process relating to charging of battery 2015. Charging ECU 2500 also communicates with server 1400, and effects transmission and reception of messages between server 1400 and other ECUs in vehicle 2001. Charging ECU 2500 may be capable of communicating with other devices outside the vehicle beside server 1400.

In in-vehicle network system 2000, vehicle 2001 and server 1400 are capable of communicating with each other through a plurality of communication routes, as illustrated in FIG. 16. For example, the plurality of communication routes include a communication route via communication ECU 2300 (TCU) and a communication route via charging ECU 2500.

[2.2 Structure of Communication ECU 2300]

Figure 17:
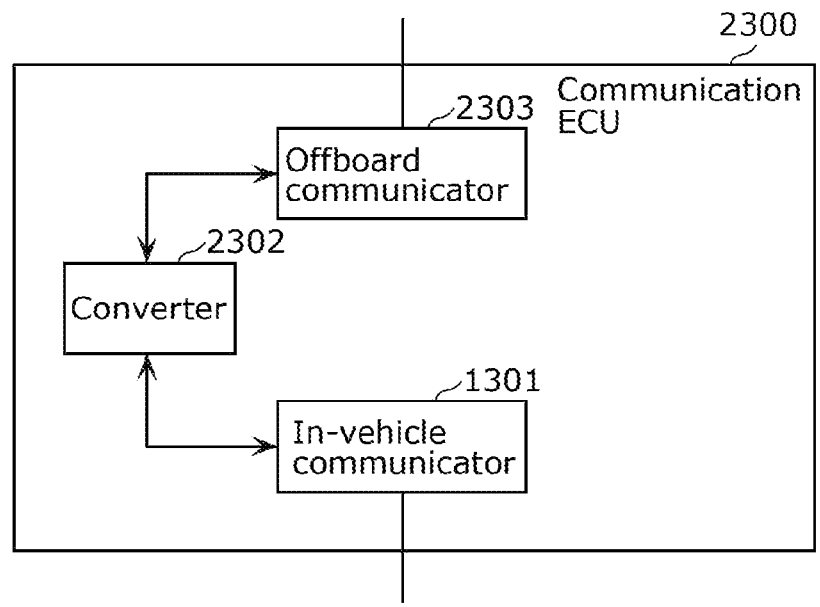
FIG. 17 is a diagram illustrating an example of a structure of a communication ECU in Embodiment 2.

FIG. 17 is a diagram illustrating an example of a structure of communication ECU 2300 in Embodiment 2. Communication ECU 2300 includes in-vehicle communicator 1301, converter 2302, and offboard communicator 2303.

Converter 2302 converts data that needs to be transferred out of messages received via one of in-vehicle communicator 1301 and offboard communicator 2303 into a predetermined format, and transmits the converted data to the other one of in-vehicle communicator 1301 and offboard communicator 2303.

Offboard communicator 2303 notifies converter 2302 of messages received from server 1400. Offboard communicator 2303 also transmits messages notified from converter 2302, to server 1400. Offboard communicator 2303 serves as an anomaly detection result transmitter that, in the case where a communication route between communication ECU 2300 and server 1400 is determined out of the plurality of communication routes, transmits anomaly detection result information to server 1400 using the determined communication route.

[2.3 Structure of Charging ECU 2500]

Figure 18:
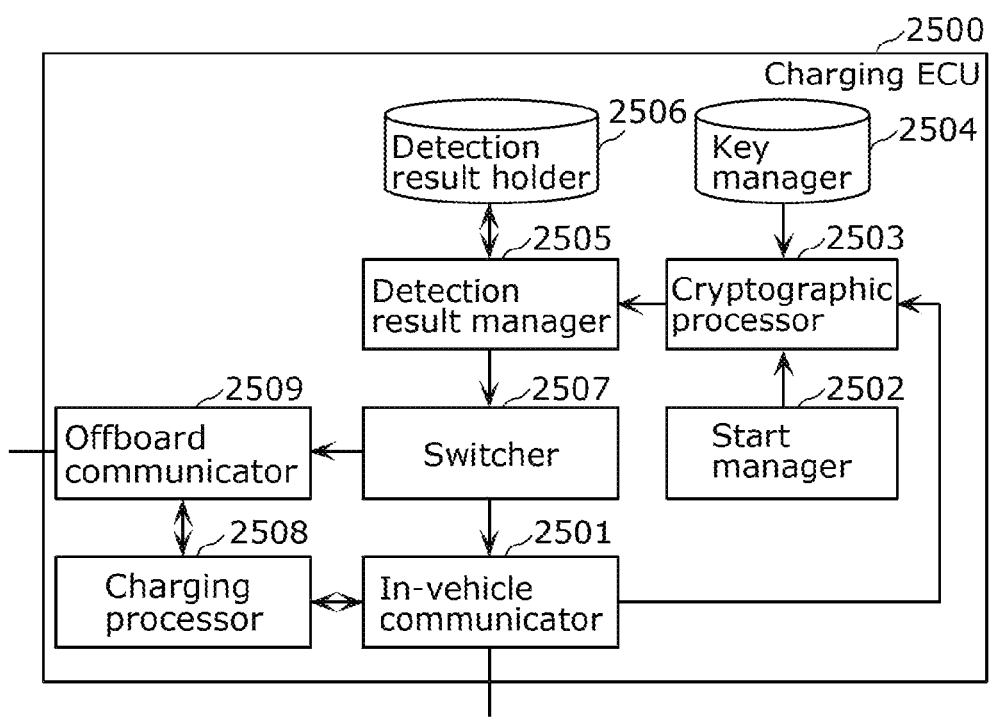
FIG. 18 is a diagram illustrating an example of a structure of a charging ECU in Embodiment 2.

FIG. 18 is a diagram illustrating an example of a structure of charging ECU 2500 in Embodiment 2. Charging ECU 2500 includes in-vehicle communicator 2501, start manager 2502, cryptographic processor 2503, key manager 2504, detection result manager 2505, detection result holder 2506, switcher 2507, charging processor 2508, and offboard communicator 2509.

In-vehicle communicator 2501 communicates with other ECUs via the in-vehicle network. In-vehicle communicator 2501 notifies cryptographic processor 2503 and charging processor 2508 of received messages. In-vehicle communicator 2501 transmits messages notified from switcher 2507 or charging processor 2508 to other ECUs.

Start manager 2502 handles a start process of charging ECU 2500 and a start process of each function of charging ECU 2500. In the case where, at the time of start, the validity of the details of the start needs to be checked, start manager 2502 notifies cryptographic processor 2503 of the need.

Cryptographic processor 2503 verifies a message authentication code (MAC) included in each message using a key or a certificate held in key manager 2504, and notifies detection result manager 2505 of the result. Moreover, in response to notification from start manager 2502, cryptographic processor 2503 checks the validity of the device or function at the time of start, and notifies detection result manager 2505 of the result. Cryptographic processor 2503 is an example of an anomaly detector that detects an anomaly in vehicle 2001.

Key manager 2504 holds keys and certificates used in cryptographic processor 2503.

Detection result manager 2505 stores the result of detection of an anomaly in vehicle 2001 notified from cryptographic processor 2503, in detection result holder 2506 together with peripheral information. Detection result manager 2505 also notifies switcher 2507 of the information held in detection result holder 2506 as a detection result state message (also referred to as "anomaly detection result information"), in order to transmit the detection result state message to communication ECU 2300 via in-vehicle communicator 2501 or to server 1400 via offboard communicator 2509. An example of a detection rule is illustrated in FIG. 19. An example of the message format of the detection result state message is illustrated in FIG. 20.

Detection result holder 2506 holds detection result data notified from detection result manager 2505. In response to a read instruction from detection result manager 2505, detection result holder 2506 notifies detection result manager 2505 of the detection result data. An example of the data held in detection result holder 2506 is the same as that in Embodiment 1, and accordingly its description is omitted.

Switcher 2507, having received the notification of the information to be transmitted to server 1400 from detection result manager 2505, determines whether to notify communication ECU 2300 or server 1400 of the information. In the case of notifying communication ECU 2300, switcher 2507 notifies communication ECU 2300 via in-vehicle communicator 2501. In the case of notifying server 1400, switcher 2507 notifies server 1400 via offboard communicator 2509. Switcher 2507 is an example of a determiner that determines, out of the plurality of communication routes, a communication route for transmitting anomaly detection result information indicating a result of detection of an anomaly in vehicle 2001 to server 1400 according to occurrence of a specific anomaly. For example, switcher 2507 determines, out of the plurality of communication routes, the communication route for transmitting the anomaly detection result information to server 1400, by checking the specific anomaly that has occurred against a table in which each type of anomaly is associated with a communication route (see FIG. 19). Switcher 2507 switches the communication route used for communication between vehicle 2001 and server 1400 to the determined communication route.

Charging processor 2508 handles a process of charging battery 2015. Charging processor 2508 also has a function of notifying other ECUs of the state of battery 2015 via in-vehicle communicator 2501 and notifying server 1400 of the charging process execution history via offboard communicator 2509.

Offboard communicator 2509 communicates with server 1400 via offboard charging equipment (not illustrated). Offboard communicator 2509 notifies charging processor 2508 of received messages. Offboard communicator 2509 transmits messages notified from switcher 2507 or charging processor 2508, to server 1400. An example of the message format of the detection result state message notified from switcher 2507 to be transmitted to server 1400 is illustrated in FIG. 21. Offboard communicator 2509 serves as an anomaly detection result transmitter that, in the case where a communication route between charging ECU 2500 and server 1400 is determined out of the plurality of communication routes, transmits anomaly detection result information to server 1400 using the determined communication route.

[2.4 Example of Detection Rule]

FIG. 19 is a diagram illustrating an example of the detection rule for detecting an anomaly of a message in the in-vehicle network in Embodiment 2. As illustrated in FIG. 19, the detection rule includes a table in which specific details of each anomaly detected, an error ID corresponding to the anomaly, and route information corresponding to the error ID are associated with one another. In the case where an anomaly in the table occurs, the corresponding error ID and peripheral information are held, and then transmitted to the ECU indicated by the corresponding route information as the transmission destination.

[2.5 Example of Format of Detection Result State Message to Inside of Vehicle]

FIG. 20 is a diagram illustrating an example of the format of the detection result state message to inside the vehicle in Embodiment 2. A payload of the detection result state message to inside the vehicle (that is, the detection result state message transmitted to the in-vehicle network) includes detection result header D1101, detector ID D1102, error ID D1103, and detection result payload D1104. Since all elements are the same as those in Embodiment 1, the description of each element is omitted here. One error ID may be included in one message, as illustrated in the drawing.

[2.6 Example of Format of Detection Result State Message to Outside of Vehicle]

FIG. 21 is a diagram illustrating an example of the format of the detection result state message to outside the vehicle in Embodiment 2. A payload of the detection result state message to outside the vehicle (that is, the detection result state message transmitted to server 1400) includes detection result header D1201, vehicle ID D1202, detector ID D1203, error ID D1204, and detection result payload D1205. Since all elements are the same as those in Embodiment 1, the description of each element is omitted here. One detector ID and one error ID may be included in one message, as illustrated in the drawing.

[2.7 Example of Anomaly Information Transmission Route Switching Process Sequence]

Figure 22:
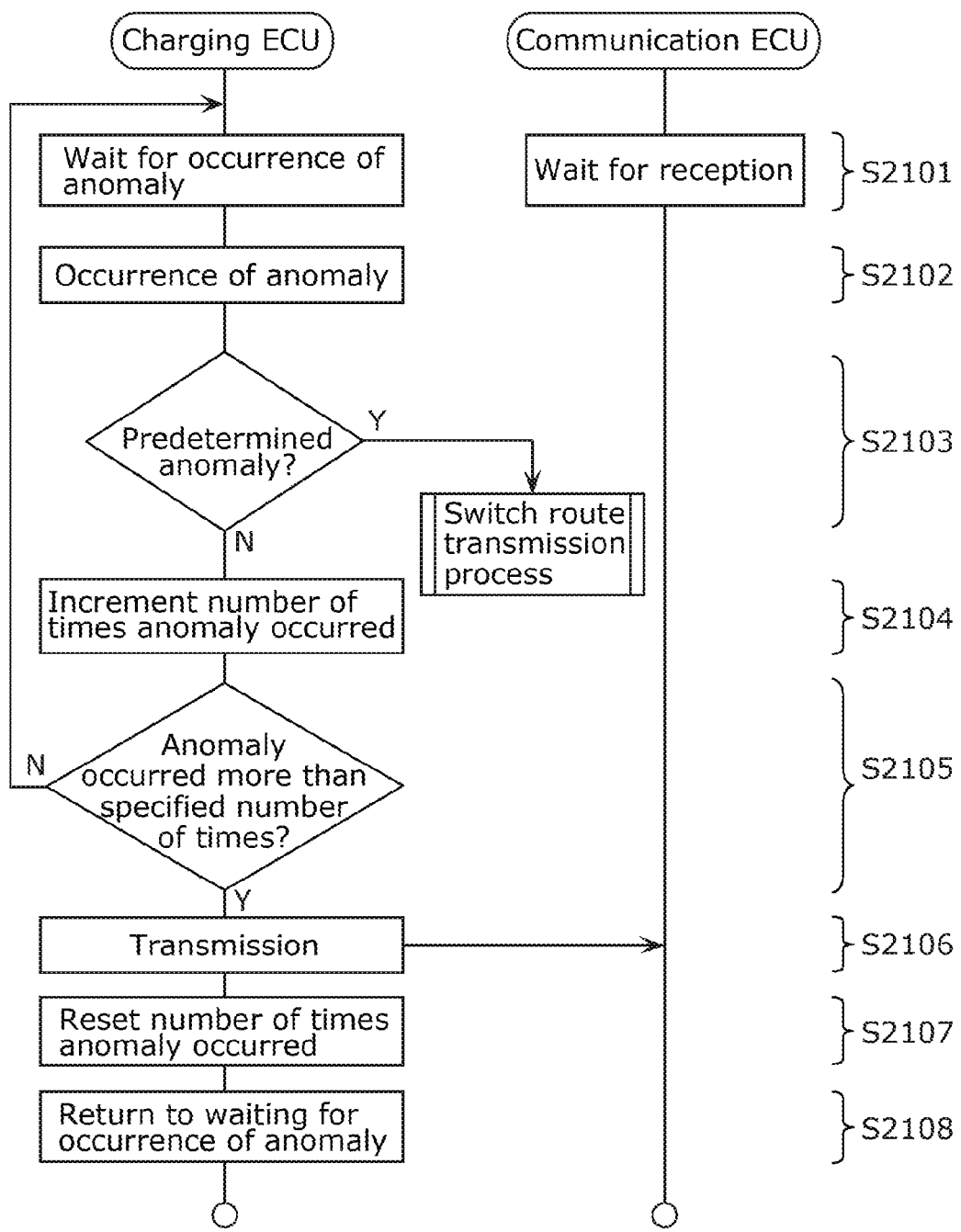
FIG. 22 is a diagram illustrating an example of a sequence relating to an anomaly information transmission route switching process in Embodiment 2.

FIG. 22 is a diagram illustrating an example of a sequence relating to an anomaly information transmission route switching process in Embodiment 2. FIG. 22 illustrates an example of a sequence of a process in which, when an anomaly in vehicle 2001 (for example, an anomaly in charging ECU 2500) as the specific anomaly occurs, anomaly detection result information is transmitted from charging ECU 2500 directly to server 1400 (that is, the communication route via charging ECU 2500 is determined out of the plurality of communication routes) instead of transmitting the anomaly detection result information to communication ECU 2300. The same steps as those in Embodiment 1 are given the same reference signs and their description is omitted.

(S2101) Charging ECU 2500 waits for occurrence of an anomaly, and communication ECU 2300 waits for communication (reception of notification from charging ECU 2500).

(S2102) Charging ECU 2500 detects an anomaly.

(S2103) Charging ECU 2500 determines whether the occurred anomaly is a predetermined anomaly in vehicle 2001. In the case where the anomaly detected by charging ECU 2500 is the predetermined anomaly in vehicle 2001, the process advances to a transmission process when switching the communication route. The process will be described in detail later, with reference to FIG. 23. In the case where the anomaly detected by charging ECU 2500 is not the predetermined anomaly in vehicle 2001, the process advances to S2104. Thus, the specific anomaly includes an anomaly in vehicle 2001.

(S2104) Charging ECU 2500 increments a counter value indicating the number of times the anomaly occurred, by 1.

(S2105) Charging ECU 2500 determines whether the number of times the anomaly occurred (the counter value) is greater than a number specified beforehand. In the case where the counter value is greater than the specified number, the process advances to S2106. In the case where the counter value is not greater than the specified number, the process advances to S2101.

(S2106) Charging ECU 2500 transmits information obtained by summarizing the details of the occurred anomaly, to communication ECU 2300.

(S2107) Charging ECU 2500 resets the counter value.

(S2108) Charging ECU 2500 completes the series of processes, and returns to S2101.

[2.8 Example of Anomaly Information Switch Route Transmission Process Sequence]

Figure 23:
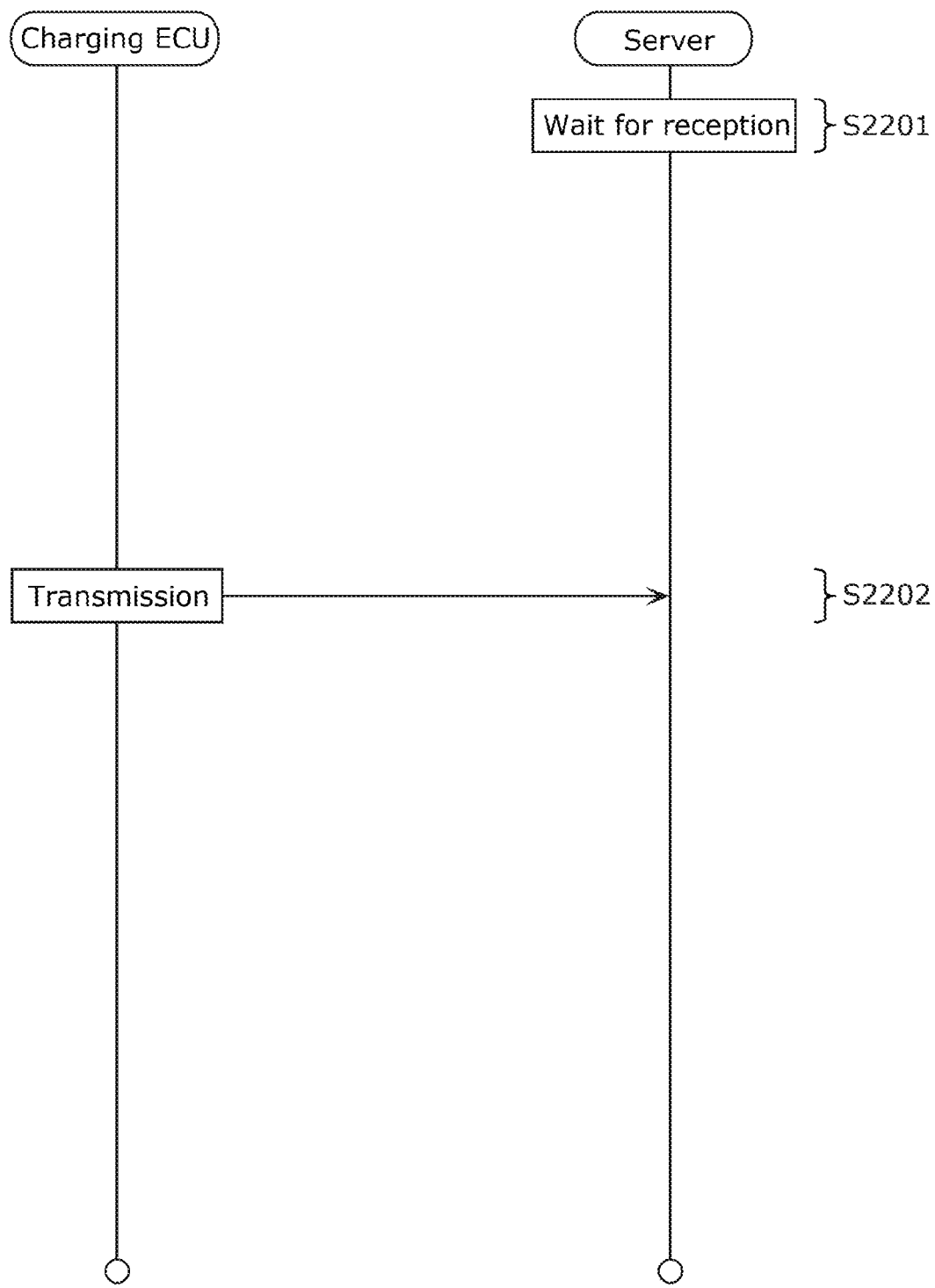
FIG. 23 is a diagram illustrating an example of a sequence relating to an anomaly information communication process in Embodiment 2.

FIG. 23 is a diagram illustrating an example of a sequence relating to an anomaly information communication process in Embodiment 2. FIG. 23 illustrates an example of a sequence of a process in which charging ECU 2500 transmits anomaly detection result information about an occurred anomaly to server 1400.

(S2201) Server 1400 waits for communication (reception of notification from communication ECU 2300 or charging ECU 2500).

(S2202) Charging ECU 2500 transmits anomaly detection result information about an occurred anomaly to server 1400.

Effects in Embodiment 2

In in-vehicle network system 2000 in Embodiment 2, a communication route is set for each anomaly that occurs beforehand, as illustrated in FIG. 19. Hence, when notifying an offboard system (for example, server 1400) of information about an anomaly that has occurred in the vehicle, the information about the anomaly can be appropriately notified to the offboard system. The safety of whole vehicle 2001 can thus be ensured. Moreover, by using a different communication route depending on the type of anomaly, the load on each communication route can be distributed.

Variation 1 of Embodiment 2

Although Embodiment 2 describes an example in which a predetermined anomaly in the network system of vehicle 2001 is detected and as a result an appropriate communication route is determined in in-vehicle network system 2000, whether to change the communication route may be determined further according to the state of the vehicle. Charging ECU 22500 that differs in structure from Embodiment 2 will be mainly described below, while omitting the description of the same elements as those in Embodiment 2.

[2.9 Structure of Charging ECU 22500]

Figure 24:
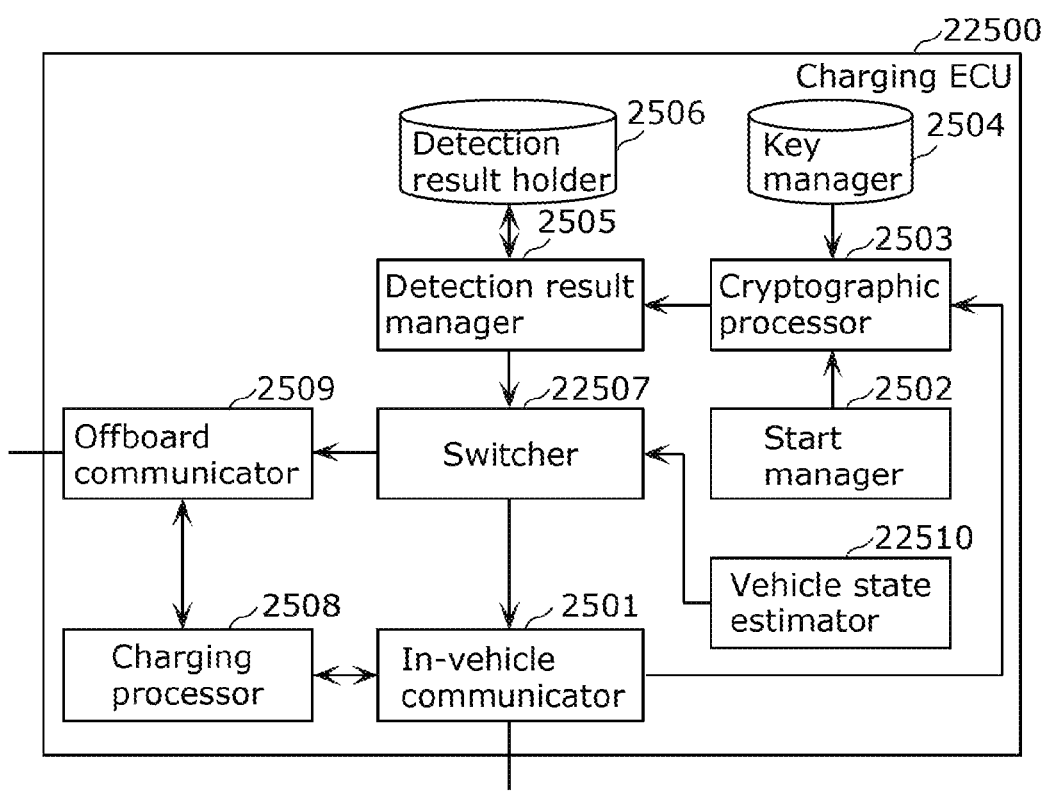
FIG. 24 is a diagram illustrating an example of a structure of a charging ECU in Variation 1 of Embodiment 2.

FIG. 24 is a diagram illustrating an example of a structure of charging ECU 22500 in Variation 1 of Embodiment 2. Charging ECU 22500 includes in-vehicle communicator 2501, start manager 2502, cryptographic processor 2503, key manager 2504, detection result manager 2505, detection result holder 2506, switcher 22507, charging processor 2508, offboard communicator 2509, and vehicle state estimator 22510.

Switcher 22507 obtains the current vehicle state from vehicle state estimator 22510. Switcher 22507 also receives notification of information to be transmitted to a server (for example, server 1400), from detection result manager 2505. In the case where the obtained current vehicle state is a specific vehicle state, switcher 22507 determines whether to notify communication ECU 2300 or server 1400 of the information to be transmitted to server 1400. In the case of notifying communication ECU 2300, switcher 22507 notifies communication ECU 2300 via in-vehicle communicator 2501. In the case of notifying server 1400, switcher 22507 notifies server 1400 via offboard communicator 2509. Switcher 22507 is an example of a determiner that determines, out of the plurality of communication routes, a communication route for transmitting anomaly detection result information indicating a result of detection of an anomaly in the vehicle to server 1400 according to occurrence of a specific anomaly and the state of the vehicle. Switcher 22507 switches the communication route used for communication between the vehicle and server 1400 to the determined communication route.

Vehicle state estimator 22510 estimates the current vehicle state, and notifies switcher 22507 of the estimated vehicle state. The estimated vehicle state is not limited and is set as appropriate.

[2.10 Example of Anomaly Information Switch Route Transmission Process Sequence]

Figure 25:
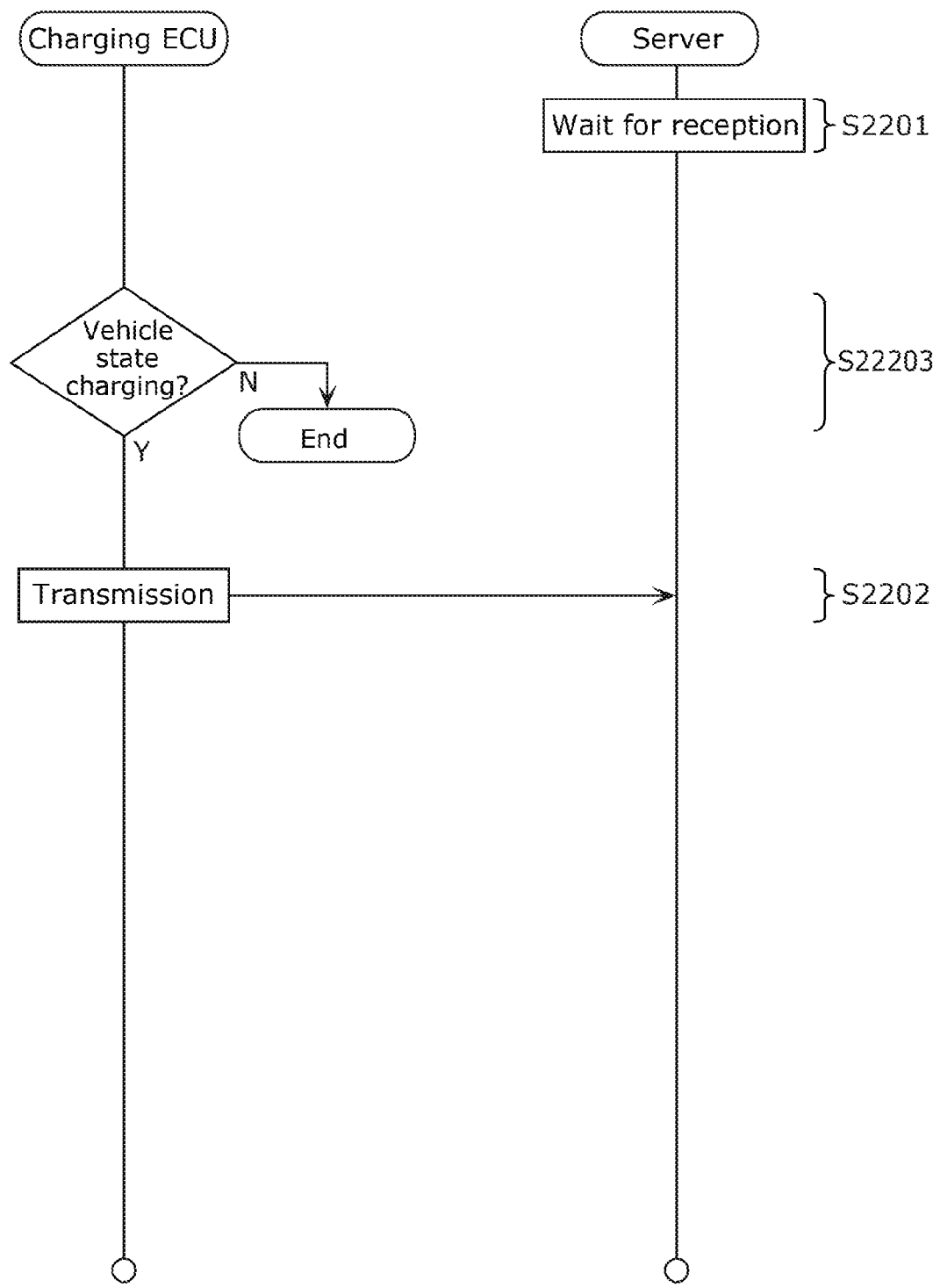
FIG. 25 is a diagram illustrating an example of a sequence relating to an anomaly information communication process in Variation 1 of Embodiment 2.

FIG. 25 is a diagram illustrating an example of a sequence relating to an anomaly information communication process in Variation 1 of Embodiment 2. FIG. 25 illustrates an example of a sequence of a process in which charging ECU 22500 transmits information about an occurred anomaly to server 1400. The same steps as those in Embodiment 2 are given the same reference signs and their description is omitted.

(S22203) Charging ECU 22500 determines whether the vehicle state is a predetermined state (for example, charging). In the case where the vehicle state is charging, the process advances to S2202. In the case where the vehicle state is not charging, the process ends. In the case where the vehicle is not charging, the vehicle is not connected to offboard charging equipment, and charging ECU 22500 is not in a state of being able to communicate with server 1400. Accordingly, the process ends.

Effects in Variation 1 of Embodiment 2

In the in-vehicle network system in Variation 1 of Embodiment 2, a communication route is set for each anomaly that occurs beforehand. Hence, when notifying an offboard system (for example, server 1400) of information about an anomaly that has occurred in the vehicle, the information about the anomaly can be appropriately notified to the offboard system. The safety of the whole vehicle can thus be ensured. Moreover, by setting beforehand the specific vehicle state in which communication is allowed, a communication error or the like can be avoided. Since caching or buffering is unnecessary, resources in the vehicle can be saved.

Other Embodiments

While an anomaly detection system according to one or more aspects of the present disclosure have been described above by way of embodiments, the present disclosure is not limited to such embodiments. Other modifications obtained by applying various changes conceivable by a person skilled in the art to the embodiments and any combinations of the structural elements in different embodiments without departing from the scope of the present disclosure are also included in the scope of one or more aspects of the present disclosure.

For example, the anomaly detection system may include a communication route transmitter that transmits communication route information indicating the communication route determined out of the plurality of communication routes according to the occurrence of the specific anomaly. The communication route transmitter may be, for example, offboard communicator 1203 in IVI 1200 or offboard communicator 1303 in communication ECU 1300 in Embodiment 1, and offboard communicator 2509 in charging ECU 2500 or offboard communicator 2303 in communication ECU 2300 in Embodiment 2. The transmitted communication route information may be displayed by a web browser or the like. This will be described below, with reference to FIG. 26.

Figure 26:
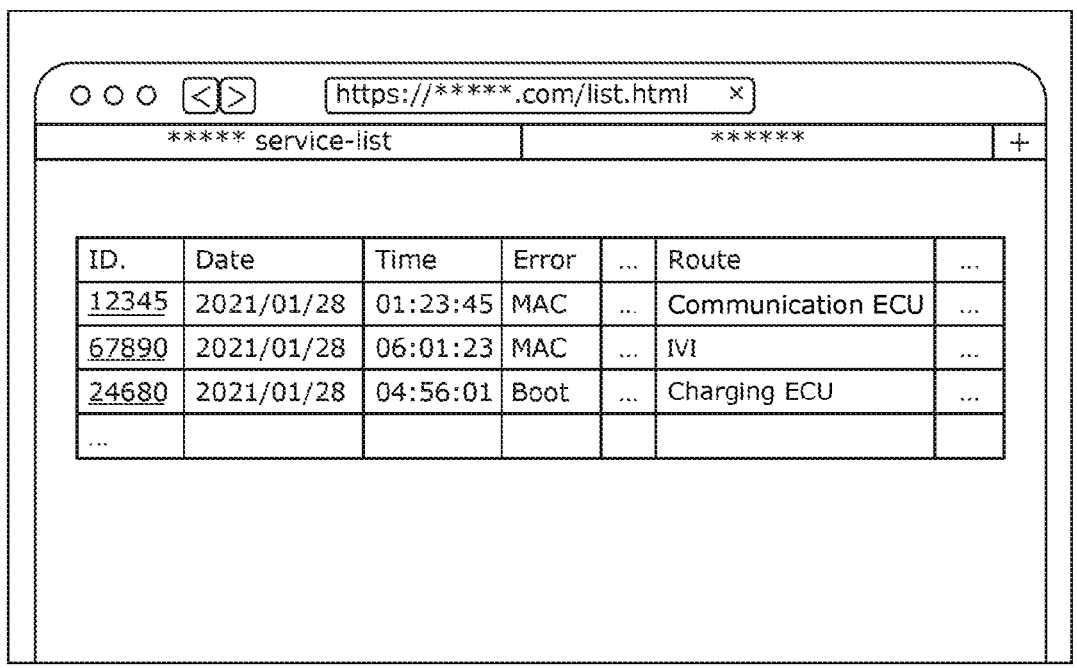
FIG. 26 is a diagram illustrating an example of display of occurred anomalies and switched communication routes in another embodiment.

FIG. 26 is a diagram illustrating an example of display of occurred anomalies and switched communication routes in another embodiment.

As illustrated in FIG. 26, the ID, date and time of occurrence, and details of each occurred anomaly and a communication route switched as a result of the occurrence of the anomaly may be displayed by a web browser or the like. This enables, for example, a person in charge of management to recognize what kind of anomaly occurred and to which communication route the communication was switched as a result of the occurrence of the anomaly.

Moreover, the details of each occurred anomaly and switched communication route may be displayed. This will be described below, with reference to FIGS. 27 and 28.

Figure 27:
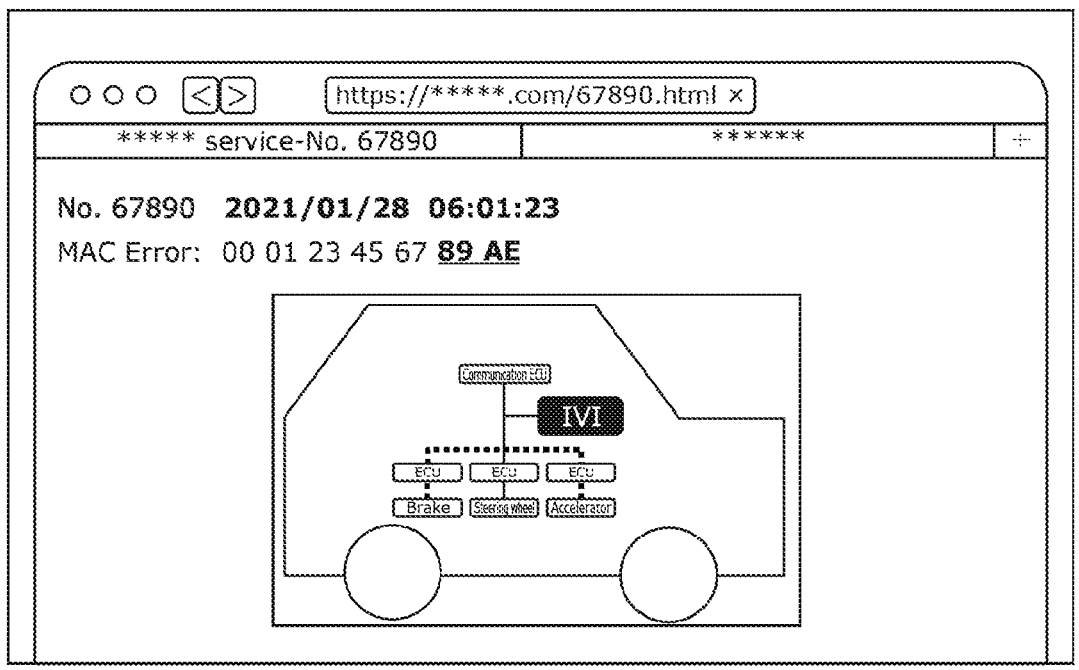
FIG. 27 is a diagram illustrating an example of detailed display of an occurred anomaly and a switched communication route in another embodiment.

FIG. 27 is a diagram illustrating an example of detailed display of an occurred anomaly and a switched communication route in another embodiment.

For example, each row (e.g. an ID in each row) in the display in FIG. 26 may be selectable, and the details of an occurred anomaly and a switched communication route in the selected row may be displayed as illustrated in FIG. 27. FIG. 27 illustrates the details of an anomaly whose ID is "67890", indicating that the anomaly is a MAC error and specifically the part "89 AE" is anomalous. Further, the part of the in-vehicle network in which the anomaly occurred is designated by a dashed line. In addition, the part "IVI" is highlighted to indicate that the switched communication route is a communication route via IVI.

Figures 28, 29:
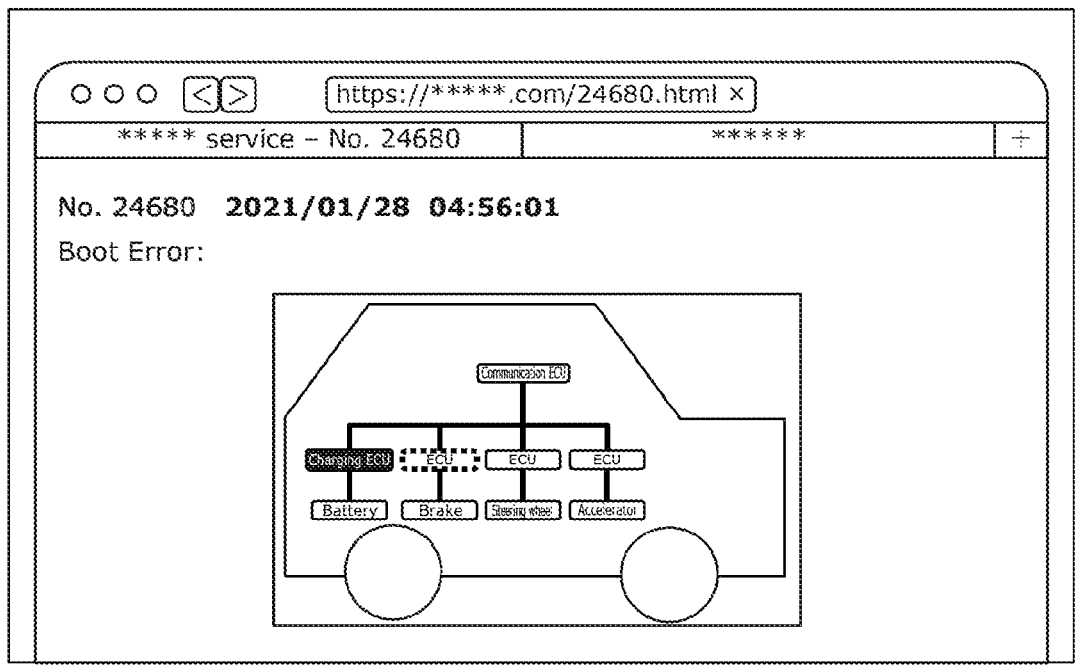
FIG. 28 is a diagram illustrating another example of detailed display of an occurred anomaly and a switched communication route in another embodiment.
FIG. 29 is a diagram illustrating an example of display for setting the correspondence between occurred anomalies and switched communication routes in another embodiment.

FIG. 28 is a diagram illustrating another example of detailed display of an occurred anomaly and a switched communication route in another embodiment.

For example, the details of an occurred anomaly and a switched communication route may be displayed as illustrated in FIG. 28. FIG. 28 illustrates the details of an anomaly whose ID is "24680", indicating that the anomaly is a boot error. Further, the part of the in-vehicle network in which the anomaly occurred is designated by a dashed line. In addition, the part "charging ECU" is highlighted to indicate that the switched communication route is a communication route via a charging ECU.

For example, the anomaly detection system may include a changer that changes the association between types of anomalies and communication routes in a table in which each type of anomaly is associated with a communication route. The changer may be, for example, detection result manager 2505 in charging ECU 2500 in Embodiment 2. This will be described below, with reference to FIG. 29.

FIG. 29 is a diagram illustrating an example of display for setting the correspondence between occurred anomalies and switched communication routes in another embodiment.

For example, the association between occurred anomalies and switched communication routes may be displayed by a web browser or the like, and a person in charge of management may set the association on the web browser or the like, as illustrated in FIG. 29. While the communication route switched when a MAC recognition error occurs is a communication route via a communication ECU in FIG. 29, the switched communication route may be changed to a communication route via a charging ECU or IVI. For example, in the case where the setting is changed on the web browser or the like, information indicating the change may be notified to the changer, and the changer may change the association between the types of anomalies and the communication routes in the table based on the information.

The foregoing embodiments describe an example in which the CAN protocol is used as the in-vehicle network, but the present disclosure is not limited to such. For example, CAN-FD (CAN with Flexible Data Rate), LIN (Local Interconnect Network), MOST (Media Oriented Systems Transport), Ethernet®, or the like may be used as the in-vehicle network. The in-vehicle network may be a combination of two or more of these networks as sub-networks.

The foregoing embodiments describe an example in which an ECU including a switcher estimates the vehicle state. Alternatively, a specific ECU may determine the vehicle state, and other ECUs may obtain the determined vehicle state via the in-vehicle network. As another example, each ECU may determine the vehicle state independently. Examples of vehicle states determined include not only ignition-on and charging but also stopped, parked, accessary-on, running, low-speed running, and high-speed running.

The foregoing embodiments describe an example in which MAC error, Authenticated Boot, and TEE (Trusted Execution Environment) start error in CAN are used as anomaly detection result information, but the present disclosure is not limited to such. Examples of anomaly information that can be used as anomaly detection result information include various anomaly information observed by network systems or ECUs, such as unauthorized application detection information using system logs, firewall error information, and IDS (Intrusion Detection System) detection information.

The foregoing embodiments describe an example in which the detection result manager and the detection result holder are included in the same ECU that actually generates anomaly detection result information, but the present disclosure is not limited to such. For example, the detection result holder alone may be present as an event data recorder (EDR) as a single ECU, or anomaly detection result information generated by a plurality of ECUs may be collected in the detection result manager included in a specific ECU.

Embodiment 1 describes a predetermined number of retry errors as a communication error. However, this is an example, and any communication error is applicable. Examples of communication errors include a timeout of a certain period of time and an error of authentication using a certificate or the like.

The foregoing embodiments describe the case where communication routes include a communication route via IVI and a communication route via a charging ECU. However, this is an example, and any communication means may be used. Examples of communication routes that can be used include tethering through Wi-Fi or Bluetooth using the driver's smartphone, ETC (Electronic Toll Collection System) which is communication with a communication device installed at a specific location, and DSRC (Dedicated Short Range Communications).

The foregoing embodiments describe an example in which the communication route is completely switched to perform transmission, but a plurality of communication routes may be simultaneously used for transmission for redundancy. Moreover, the communication route may be determined as a result of server 1400 or server 11400 comparing the communication states in the respective communication routes.

The foregoing embodiments describe an example in which the switching destination ECU (communication route) is an ECU that is physically apart, but the present disclosure is not limited to such. The switching destination ECU may be an ECU that is logically another ECU.

For example, an ECU such as a hypervisor that combines the functions of a plurality of ECUs may be introduced in the anomaly detection system. In the case where, in such an ECU, a plurality of external interfaces are held on a plurality of virtual operating systems (OSs) that each operate on a different virtual machine, the communication route may be switched from a predetermined communication route of one OS to a communication route of another OS different from the predetermined communication route, according to the occurrence of the specific anomaly.

For example, a plurality of ECUs from among ECUs such as ECUs 1100a to 1100c, IVI 1200, communication ECUs 1300, 11300, and 2300, and charging ECUs 2500 and 22500 may be implemented by a virtual environment constructed by one physical device (computer) or the like.

Figure 30:
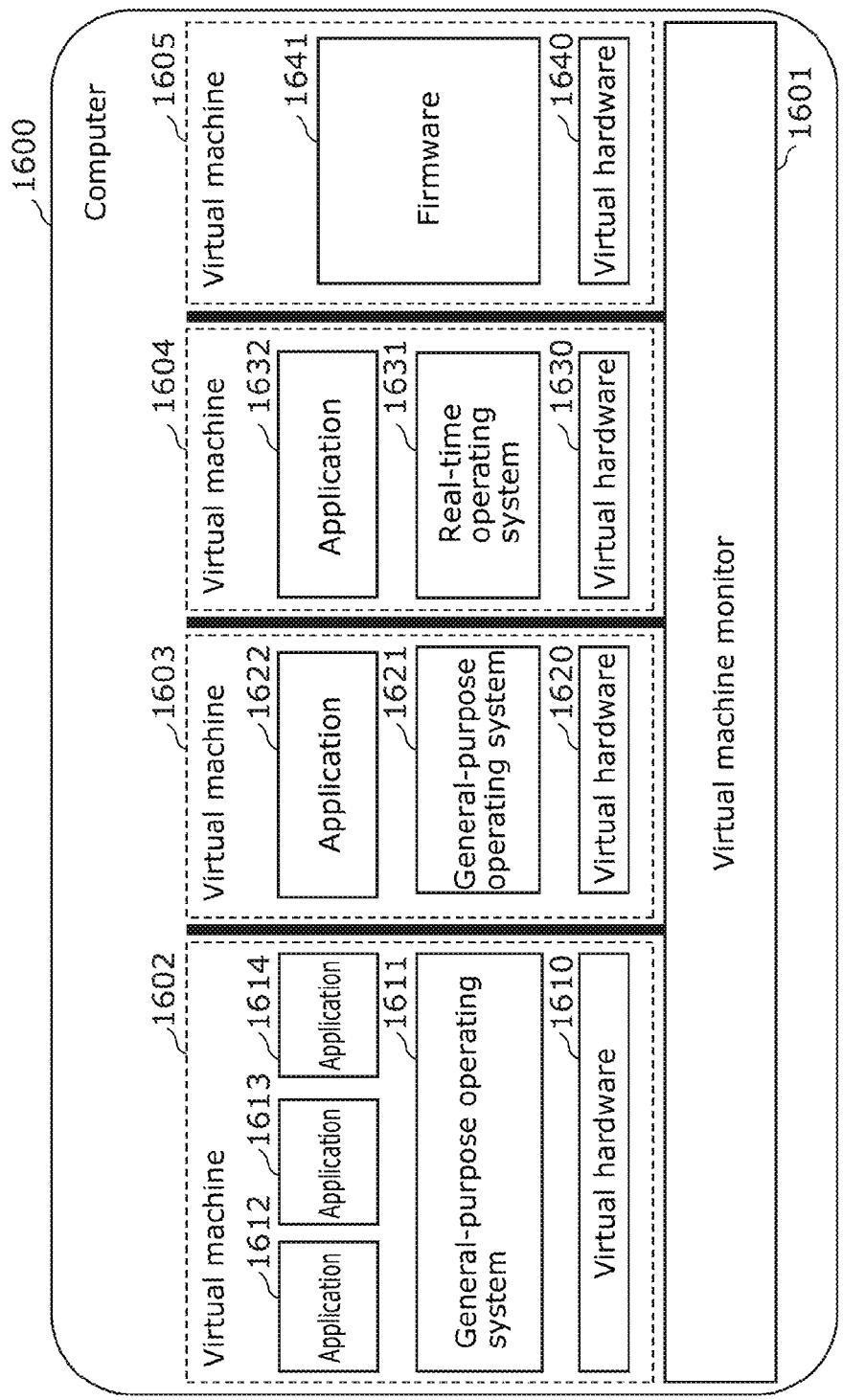
FIG. 30 is a diagram illustrating an example of a software structure in a virtual environment implemented by a computer in another embodiment.

FIG. 30 is a diagram illustrating an example of a software structure of a virtual environment implemented by computer 1600 in another embodiment. Computer 1600 includes virtual machine monitor 1601 and virtual machines 1602 to 1605. Virtual machine 1602 includes virtual hardware 1610, general-purpose operating system 1611, and applications 1612 to 1614. Virtual machine 1603 includes virtual hardware 1620, general-purpose operating system 1621, and application 1622. Virtual machine 1604 includes virtual hardware 1630, real-time operating system 1631, and application 1632. Virtual machine 1605 includes virtual hardware 1640 and firmware 1641. ECUs may be implemented by such a software structure of a virtual environment.

The number of applications that operate on each of general-purpose operating systems 1611 and 1621 and real-time operating system 1631 is an example, and more applications may operate.

Although the above describes the virtual environment constructed by two virtual machines on each of which a general-purpose operating system operates, one virtual machine on which a real-time operating system operates, and one virtual machine on which firmware operates, this is an example. For example, the virtual environment may be constructed by only a virtual machine on which firmware operates, or constructed by only a virtual machine on which firmware operates and a virtual machine on which a real-time operating system operates.

Each device in the foregoing embodiments is specifically a computer system including a microprocessor, ROM, RAM, a hard disk unit, a display unit, a keyboard, a mouse, or the like. A computer program is recorded in the RAM or hard disk unit. The device achieves its functions by the microprocessor operating according to the computer program. The computer program is configured by combining multiple command codes indicating instructions to the computer, to achieve predetermined functions.

Part or all of the structural elements constituting each device in the foregoing embodiments may be configured as a single system large scale integration (LSI). A system LSI is a super-multifunctional LSI manufactured by integrating multiple components on a single chip, and specifically is a computer system including a microprocessor, ROM, RAM, and so forth. A computer program is recorded in the RAM. The system LSI achieves its functions by the microprocessor operating according to the computer program.

The parts of the structural elements constituting each device may be individually formed into one chip, or part or all thereof may be included in one chip.

While description has been made regarding a system LSI, there are different names such as IC, LSI, super LSI, and ultra LSI, depending on the degree of integration. The circuit integration technique is not limited to LSIs, and dedicated circuits or general-purpose processors may be used to achieve the same. A field programmable gate array (FPGA) which can be programmed after manufacturing the LSI, or a reconfigurable processor where circuit cell connections and settings within the LSI can be reconfigured, may be used.

Further, in the event of the advent of an integrated circuit technology which would replace LSIs by advance of semiconductor technology or a separate technology derived therefrom, such a technology may be used for integration of the functional blocks. Application of biotechnology is a possibility.

Part or all of the structural elements constituting each device may be configured as an IC card detachably mountable to the device or a standalone module. The IC card or module is a computer system including a microprocessor, ROM, RAM, and so forth. The IC card or module may include the above-described super-multifunctional LSI. The IC card or module achieves its functions by the microprocessor operating according to the computer program. The IC card or module may be tamper-resistant.

For example, the presently disclosed techniques can be implemented not only as an anomaly detection system but also as an anomaly detection method including steps (processes) performed by structural elements included in the anomaly detection system.

Figure 31:
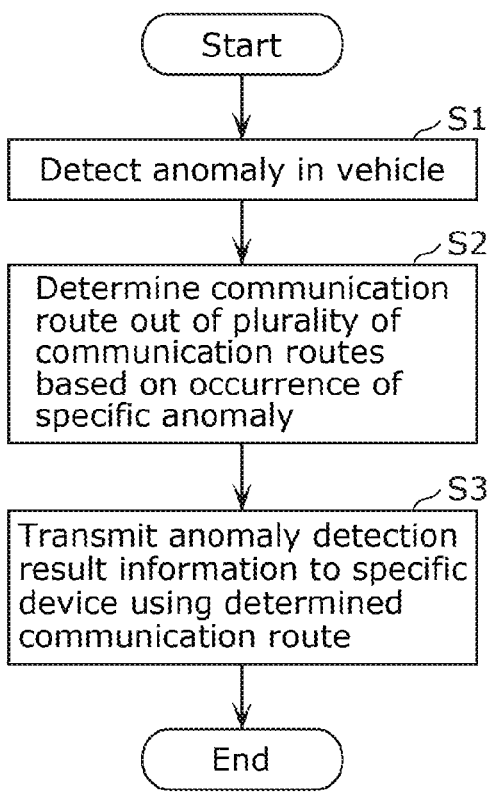
FIG. 31 is a flowchart illustrating an example of an anomaly detection method in another embodiment.

FIG. 31 is a flowchart illustrating an example of an anomaly detection method in another embodiment.

The anomaly detection method is an anomaly detection method in an in-vehicle network system that includes one or more ECUs mounted on a vehicle and in which the vehicle and a specific offboard device are capable of communicating with each other through a plurality of communication routes. As illustrated in FIG. 31, the anomaly detection method includes: detecting an anomaly in the vehicle (S1); determining, out of the plurality of communication routes, a communication route for transmitting anomaly detection result information indicating a result of detection of the anomaly in the vehicle to the specific offboard device, according to occurrence of a specific anomaly (S2); and transmitting the anomaly detection result information to the specific offboard device using the communication route determined (S3).

For example, the steps included in the anomaly detection method may be executed by a computer (computer system). The presently disclosed techniques can be implemented as a computer program for causing a computer to execute the steps included in the anomaly detection method, or digital signals made up of the program.

The present disclosure may be the computer program or the digital signals recorded in a computer-readable recording medium, such as flexible disk, hard disk, CD-ROM, MO, DVD, DVD-ROM, DVD-RAM, Blu-ray® disc (BD), or semiconductor memory. The present disclosure may also be the digital signals recorded in these recording mediums.

The present disclosure may be an arrangement where the computer program or the digital signals are transmitted over an electric communication line, a wireless or wired communication line, a network such as the Internet, data broadcasting, or the like.

The present disclosure may be a computer system including a microprocessor and memory, where the memory records the computer program and the microprocessor operates according to the computer program.

The present disclosure may also be carried out by another independent computer system, by the program or digital signals being recorded in the recording medium and being transported, or by the program or digital signals being transferred over the network or the like.

The foregoing embodiments and variations may be combined in any way.

INDUSTRIAL APPLICABILITY

The present disclosure is applicable to an in-vehicle network system including a vehicle and a device that is located outside the vehicle and communicates with the vehicle.

The invention claimed is:

1. An anomaly detection system in an in-vehicle network system that includes one or more electronic control units mounted on a vehicle and in which the vehicle and a specific offboard device are capable of communicating through a plurality of communication routes, the anomaly detection system comprising:

a processor; and a memory including at least one program that, when executed by the processor, causes the processor to perform operations, the operations including:

setting, in a table stored in a database, a communication route from amongst the plurality of communication routes for each of a plurality of anomalies before any of the plurality of anomalies occurs;

detecting a specific anomaly, from amongst the plurality of anomalies, in the vehicle;

determining, out of the plurality of communication routes, the communication route for transmitting anomaly detection result information indicating a result of detection of the specific anomaly in the vehicle to the specific offboard device, according to the setting of the specific anomaly in the table; and transmitting the anomaly detection result information to the specific offboard device using the communication route determined, wherein, for each of the plurality of anomalies, each of the plurality of communication routes is available for the communication route, different anomalies are associated with each of the plurality of communication routes, each of plural ones of the plurality of anomalies is associated with a single one of the plurality of communication routes, each of the plurality of communication routes is confined within the vehicle;

the communication route is determined, out of the plurality of communication routes, based on the specific anomaly detected, and an end-point of the communication route, which is determined out of the plurality of communication routes, transmits the anomaly detection result information to the specific offboard device, which is external to the vehicle.

2. The anomaly detection system according to claim 1, wherein the specific anomaly is in communication with an outside of the vehicle.

3. The anomaly detection system according to claim 2, wherein the specific anomaly includes a process of transmission of the anomaly detection result information to the specific offboard device.

4. The anomaly detection system according to claim 2, wherein the specific anomaly includes a process of reception of the anomaly detection result information from the specific offboard device.

5. The anomaly detection system according to claim 1, wherein the specific anomaly includes an anomaly in the vehicle.

6. The anomaly detection system according to claim 1, wherein the processor determines, out of the plurality of communication routes, the communication route for transmitting the anomaly detection result information to the specific offboard device, by checking the specific anomaly that has occurred against the table in which each type of anomaly is associated with a corresponding one of the plurality of communication routes.

7. The anomaly detection system according to claim 6, wherein the operations further include:

changing an association between a type of the specific anomaly detected and the corresponding communication route in the table.

8. The anomaly detection system according to claim 1, wherein the plurality of communication routes includes a communication route via a telematics control unit (TCU).

9. The anomaly detection system according to claim 1, wherein the plurality of communication routes includes a communication route via in-vehicle infotainment (IVI).

10. The anomaly detection system according to claim 1, wherein the plurality of communication routes includes a communication route via an electronic control unit that handles charging of a battery.

11. The anomaly detection system according to claim 1, wherein the processor determines, out of the plurality of communication routes, the communication route for transmitting the anomaly detection result information to the specific offboard device, according to the specific anomaly and a state of the vehicle.

12. The anomaly detection system according to claim 1, further comprising:

a communication interface that transmits communication route information indicating the communication route determined.

13. An anomaly detection method in an in-vehicle network system that includes one or more electronic control units mounted on a vehicle and in which the vehicle and a specific offboard device are capable of communicating through a plurality of communication routes, the anomaly detection method comprising:

setting, in a table stored in a database, a communication route from amongst the plurality of communication routes for each of a plurality of anomalies before any of the plurality of anomalies occurs;

detecting a specific anomaly, from amongst the plurality of anomalies, in the vehicle;

determining, out of the plurality of communication routes, the communication route for transmitting anomaly detection result information indicating a result of detection of the specific anomaly in the vehicle to the specific offboard device, according to the setting of the specific anomaly in the table; and transmitting the anomaly detection result information to the specific offboard device using the communication route determined, wherein, for each of the plurality of anomalies, each of the plurality of communication routes is available for the communication route, different anomalies are associated with each of the plurality of communication routes, each of plural ones of the plurality of anomalies is associated with a single one of the plurality of communication routes, each of the plurality of communication routes is confined within the vehicle;

the communication route is determined, out of the plurality of communication routes, based on the specific anomaly detected, and an end-point of the communication route, which is determined out of the plurality of communication routes, transmits the anomaly detection result information to the specific offboard device, which is external to the vehicle.

* * * * *